US008348761B2

(12) United States Patent
Nakatsuka et al.

(10) Patent No.: US 8,348,761 B2
(45) Date of Patent: *Jan. 8, 2013

(54) GAME SYSTEM CAPABLE OF EVALUATING THE CORRELATION OF USER OPERATION ON A GAME MACHINE WITH DISPLAYED OPERATIONAL INFORMATION AND USER OPERATION ON ANOTHER GAME MACHINE

(75) Inventors: Akito Nakatsuka, Kyoto (JP); Yuichi Ozaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,283

(22) Filed: Sep. 26, 2011

(65) Prior Publication Data

US 2012/0015727 A1      Jan. 19, 2012

Related U.S. Application Data

(60) Continuation of application No. 11/546,478, filed on Oct. 12, 2006, now Pat. No. 8,052,511, which is a division of application No. 09/986,771, filed on Nov. 9, 2001, now Pat. No. 7,485,042.

(30) Foreign Application Priority Data

Mar. 28, 2001 (JP) .................. 2001-093579

(51) Int. Cl.
  *A63F 13/00*      (2006.01)
(52) U.S. Cl. ............... 463/37; 463/7; 463/23; 463/31; 463/36; 463/40; 463/42; 463/43; 273/444; 273/445; 273/249; 273/148 B

(58) Field of Classification Search ............ 463/7, 23, 463/36, 43, 40, 31, 37, 42; 273/249, 444, 273/445, 148 B
See application file for complete search history.

(56) References Cited

U.S. PATENT DOCUMENTS 4,570,930 A    2/1986   Matheson
(Continued)

FOREIGN PATENT DOCUMENTS

JP        2000-237454        9/2000

OTHER PUBLICATIONS

U.S.P.T.O. prosecution history of U.S. Appl. No. 09/986,771, filed Nov. 9, 2001 including USPTO Office Actions mailed Jun. 18, 2007, Jan. 9, 2007, May 31, 2006, May 12, 2006, Jan. 25, 2005, Jun. 25, 2004 and Feb. 11, 2004 and Applicant responses filed Apr. 9, 2007, Oct. 12, 2006, Aug. 11, 2006, Apr. 25, 2005, Sep. 27, 2004 and Mar. 8, 2004.

(Continued)

*Primary Examiner* — Sunit Pandya
(74) *Attorney, Agent, or Firm* — Nixon & Vanderhye P.C.

(57) ABSTRACT

In a game played by a plurality of game machines through teamwork, an evaluation is performed according to the correlation among operation information obtained through communications with each of the game machines. A plurality of game machines communicate with one another to establish timing synchronization. After the game, input timings at which buttons are operated during the game are collected and then evaluated so as to determine an absolute and relative timing coincidence in a predetermined period (unison part). A predetermined number of points are added to its game score based on the evaluation.

4 Claims, 15 Drawing Sheets

U.S. PATENT DOCUMENTS

| | | | |
|---|---|---|---|
| 4,572,509 | A | 2/1986 | Sitrick |
| 5,076,584 | A | 12/1991 | Openiano |
| 5,538,255 | A | 7/1996 | Barker |
| 5,685,775 | A | 11/1997 | Bakoglu et al. |
| 5,838,909 | A | 11/1998 | Roy et al. |
| 5,899,810 | A | 5/1999 | Smith |
| 6,001,017 | A | 12/1999 | Okano et al. |
| 6,018,121 | A | 1/2000 | Devecka |
| 6,171,186 | B1 | 1/2001 | Kurosawa et al. |
| 6,227,968 | B1 | 5/2001 | Suzuki et al. |
| 6,315,668 | B1 | 11/2001 | Metke et al. |
| 6,347,998 | B1 | 2/2002 | Yoshitomi et al. |
| 6,369,313 | B2 | 4/2002 | Devecka |
| 6,371,850 | B1 | 4/2002 | Sonoda |
| 6,450,888 | B1 | 9/2002 | Takase et al. |
| 6,483,939 | B2 | 11/2002 | Ochi et al. |
| 6,572,108 | B1 | 6/2003 | Bristow |
| 6,582,309 | B2 | 6/2003 | Higurashi et al. |
| 6,609,979 | B1 * | 8/2003 | Wada .............................. 463/43 |
| 6,659,873 | B1 | 12/2003 | Kitano et al. |
| 6,685,480 | B2 | 2/2004 | Nishimoto et al. |
| 6,695,694 | B2 | 2/2004 | Ishikawa et al. |
| 6,905,413 | B1 * | 6/2005 | Terao et al. ..................... 463/40 |
| 7,128,649 | B2 | 10/2006 | Nobe et al. |
| 7,485,042 | B2 | 2/2009 | Nakatsuka et al. |

OTHER PUBLICATIONS

"Arcadia", Enterbrain, Inc., Dec. 1, 2000, vol. 1, Issue No. 7, p. 205.
"Weekly FAMITSU", ASCII Corporation, Apr. 7, 2000, vol. 15, Issue No. 14, No. 590, pp. 240-241.
"Weekly Dreamcast Magazine", Softbank Publishing, Inc., Apr. 14, 2000, vol. 17, Issue No. 13, No. 292, pp. 58-59.
USPTO prosecution history of U.S. Appl. No. 11/546,478, filed Oct. 12, 2006 including USPTO Office Actions mailed Sep. 14, 2010, Feb. 16, 2011, May 20, 2011 and Aug. 15, 2011 and Applicant Response filed Dec. 14, 2010, May 6, 2011 and Jun. 16, 2011.

* cited by examiner

F I G. 1
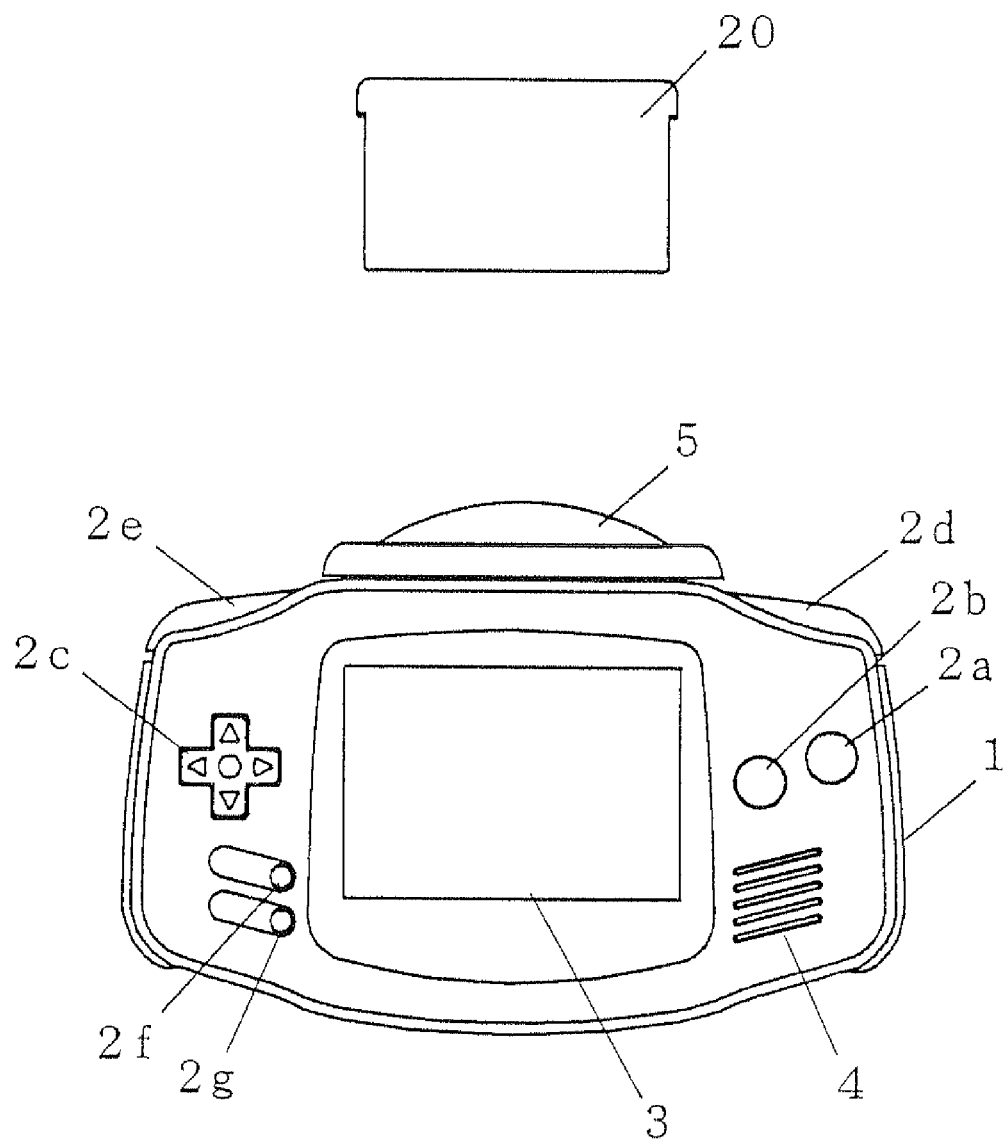

MUSIC SCORE DATA (1st GUITAR)   UNISON PART 1   UNISON PART 2

| TIMING NUMBER | 1 | 2 | 3 | 4 | 5 | 6 | 7 | 8 | 9 | 10 | 11 | 12 | 13 | 14 | 15 | 16 | 17 | ··· | E |
|---|---|---|---|---|---|---|---|---|---|---|---|---|---|---|---|---|---|---|---|
| A, B BUTTON DATA | A | B |  | A | A |  | A | B | A |  |  | A |  | A | B | B |  | ··· | A |
| CROSS KEY DATA |  | ↓ |  | → | ↑ |  |  | → | ↓ |  |  | ← |  |  | ← |  |  | ··· | ↓ |

1 BAR (under columns 1–4)

MUSIC SCORE DATA (2nd GUITAR)   UNISON PART 1   UNISON PART 2

| TIMING NUMBER | 1 | 2 | 3 | 4 | 5 | 6 | 7 | 8 | 9 | 10 | 11 | 12 | 13 | 14 | 15 | 16 | 17 | ··· | E |
|---|---|---|---|---|---|---|---|---|---|---|---|---|---|---|---|---|---|---|---|
| A, B BUTTON DATA | A |  | A |  |  | A | A | B | B | A |  | A |  | A |  |  | A | ··· | B |
| CROSS KEY DATA | ← |  |  |  |  | ↑ |  | → |  |  |  | ← |  |  |  |  |  | ··· | → |

1 BAR (under columns 1–4)

UNISON PART

F I G. 8
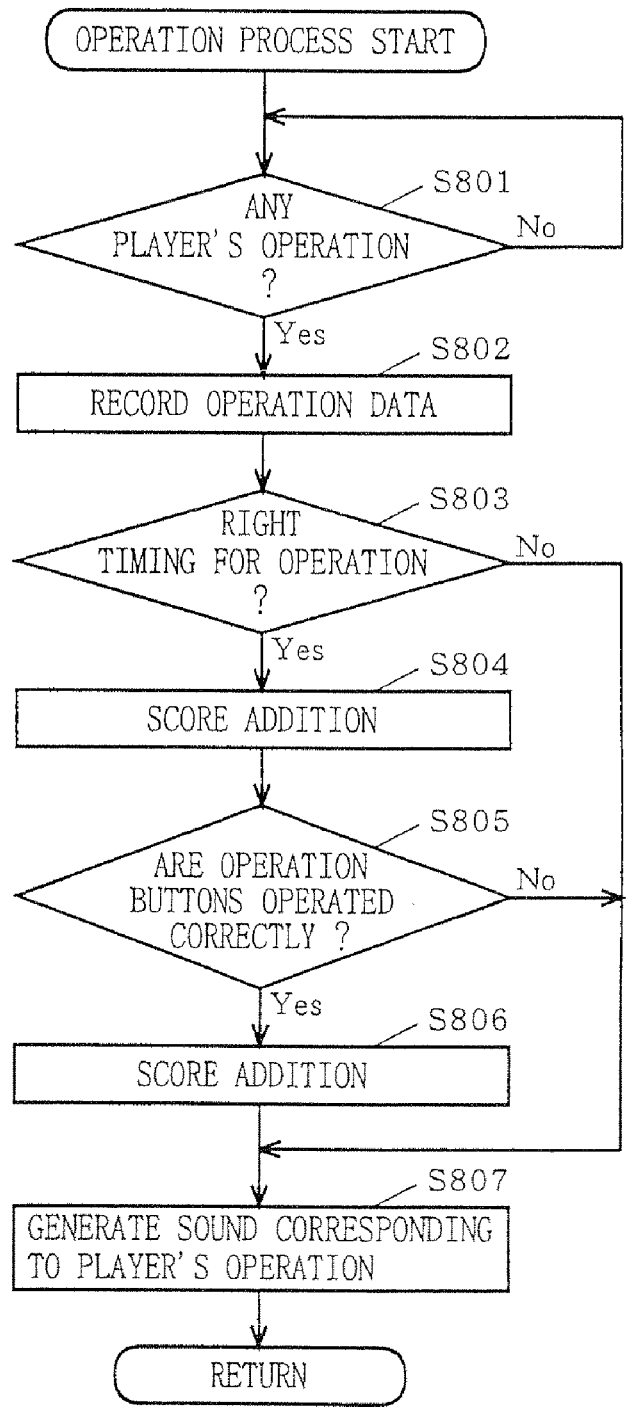

F I G. 1 8
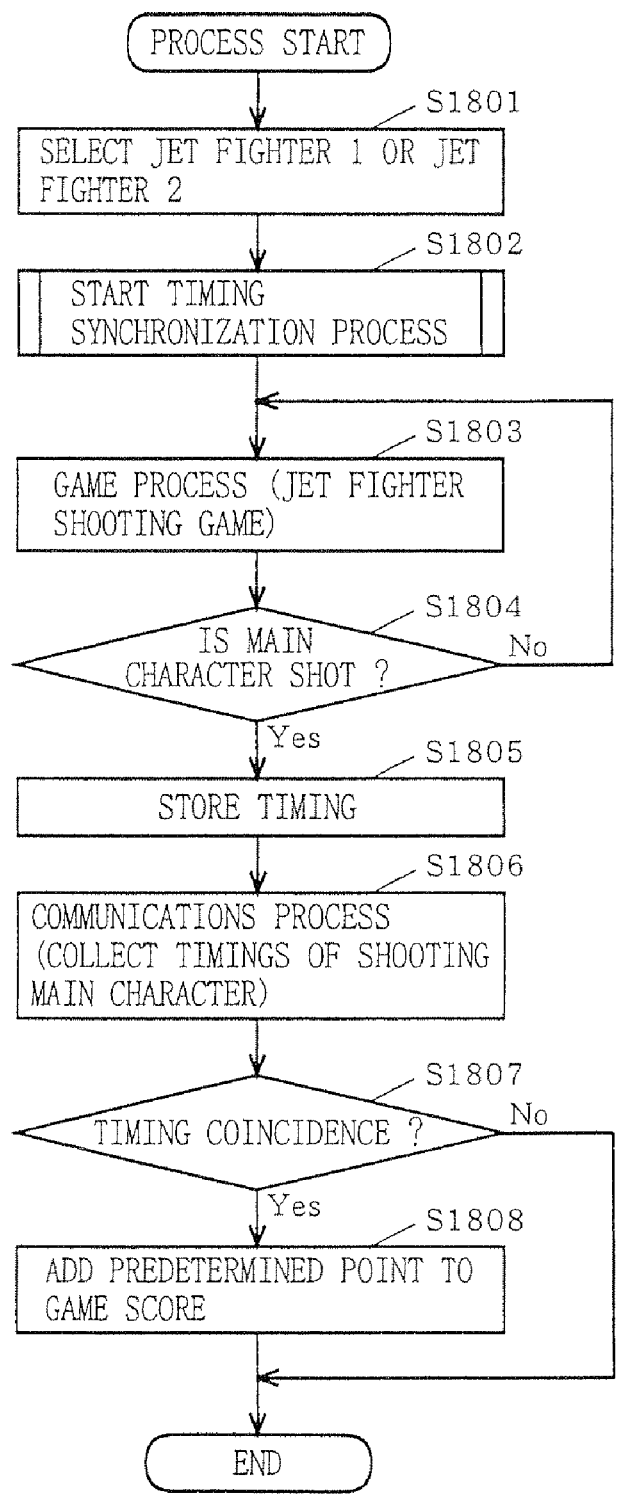

GAME SYSTEM CAPABLE OF EVALUATING THE CORRELATION OF USER OPERATION ON A GAME MACHINE WITH DISPLAYED OPERATIONAL INFORMATION AND USER OPERATION ON ANOTHER GAME MACHINE

This application is a continuation of application Ser. No. 11/546,478, filed Oct. 12, 2006, which is a divisional of Ser. No. 09/986,771, filed Nov. 9, 2001, which claims priority to Japanese Application No. 2001-093579, filed Mar. 28, 2001, the entire contents of each of which are hereby incorporated by reference in this application.

BACKGROUND

1. Technical Field

Present non-limiting embodiments relate to game machines and game programs executed by such game machines. More specifically, present non-limiting embodiments relate to game machines for evaluating timings based on a player's operation, including evaluating timings of a game process (presentation effects) based on a plurality of players' operations corresponding to reproduction of music data, and game programs to be executed by such game machines.

2. Description of Background Art

This type of conventional game machine has been disclosed, for example, in Japanese Patent Laid-Open Publication No. 2000-237454. In such a game machine, a drum rhythm game machine and a guitar rhythm game machine are synchronized with each other in terms of BGM music and presentation instructions so that harmonious music play can be realized as actual band play.

In the conventional technique described in the above publication, however, the game machines (drum rhythm and guitar rhythm) independently evaluate the player's operation. The manner of evaluation of each player's operation is exactly the same as the case of single player, involving a determination of whether or not a predetermined criterion is met.

Therefore, even if a plurality of game machines perform music play at the same time, there is not much correlation among the game machines (bandparts), and there is not much fun in obtaining a high score through teamwork either. Moreover, the evaluation manner remains exactly the same between independent play and harmonious play, thereby failing to provide zest and surprise.

SUMMARY OF EXEMPLARY NON-LIMITING EMBODIMENTS

Therefore, an object of present exemplary non-limiting embodiments is to provide game machines capable of performing evaluation, in a game played by a plurality of game machines, according to the correlation among operation information obtained through communications with each of the game machines, and game programs executed in such game machines.

Present exemplary non-limiting embodiments may include one or more of the following exemplary features to attain the object above.

A first aspect of present exemplary non-limiting embodiments is directed to a game machine for executing a predetermined game in response to a player's operation. The game machine comprises a display section, operation switches, a communications section, a start timing synchronization section, a prompt information storage section, a display control section, first and second operation timing storage sections, and a correlation evaluation section.

The display section displays a game screen. The operation switches are operated by the player. The communications section performs data communications among other game machines. The start timing synchronization section establishes start-timing synchronization with the other game machines in the game by communications via the communications section. The prompt information storage section stores operation timing data defining an operation timing of the operation switches to be operated by the player. The display control section has, in response when the game is synchronously started, the display section displayed information about the operation timings of the operation switches to be operated by the player based on the operation timing data. The first operation timing storage section stores data relating to the operation timings of the operation switches operated by the player responding to the information displayed on the display section. The second operation timing storage section acquires and stores the data which is stored in the first operation timing storage section of the other game machines through communications via the communications section. The correlation evaluation section evaluates correlation in terms of game operation with the other game machines based on the data stored in the first operation timing storage section and the second operation timing storage section.

As described above, in the first aspect, in a game played by a plurality of game machines, evaluation is made according to the correlation among several pieces of operation information obtained through communications with each of the game machines. Therefore, the correlation among the players' operations become high and the zest is increased to a greater degree than the time of independent play. Moreover, determination is not made only based on the coincidence with a predetermined criterion but with the correlation among the several pieces of the operation information. Therefore, the players can find the game quite fun by aiming a high score through teamwork.

Further, an independent evaluation section may be further provided for evaluating whether the timing based on the data stored in the first operation timing storage section is in a predetermined range from the timing based on the operation timing data.

With such a structure, evaluation is made in two ways, considering each single game machine, and considering the correlation among several of those game machines. Accordingly, the players can enjoy two types of evaluations.

Also, the correlation evaluation section may evaluate whether both the timing based on the data stored in the first operation timing storage section and the timing based on the data stored in the second operation timing storage section are in a predetermined range.

Alternatively, the correlation evaluation section may evaluate, by using, as a criterial timing, the timing based on either the data stored in the first operation timing storage section or the data stored in the second operation timing storage section whichever being the operation timing closest to the operation timing defined by the operation timing data at a predetermined timing, from the criterial timing based on one of the data, whether the timing based on the other data is in the predetermined range.

In such a structure, since the degree of coincidence of the operation timings is evaluated among a plurality of game machines, the players can enjoy their game operation while watching other game machines' timings to synchronize therewith.

Further, the correlation evaluation section may evaluate whether the timing based on either the data stored in the first operation timing storage section or the data stored in the second operation timing storage section is in a predetermined range from the timing based on the operation timing data at a predetermined timing, and whether both the timing based on one of the data and the timing based on the other data are in the predetermined range.

In such a structure, only when the degree of the coincidence with the predetermined criterion is high, evaluation is made against any condition for the correlation among the operation information being satisfied. Thus, the independent evaluation is always considered with no contradiction.

Here, alternatively, the prompt information storage section may store the operation timing data defining a plurality of the operation timings of the operation switches to be operated by the player, an evaluation timing setting section may be further provided for setting at least one of the plurality of the operation timings based on the operation timing data as an evaluation timing, and the first operation timing storage section may store the data relating to the operation timing corresponding to the evaluation timing.

With such a structure, there are a plurality of operation timings which are supposed to be operated by the player, whereby the game can be increased in complexity. If this is the case, at least one timing to be evaluated may be selected from the operation timings so that the communications amount can be reduced among the plurality of game machines.

Alternatively, a sound generation section for generating a predetermined sound in response to the operation switches whichever operated, and a part selection section for selecting one of a plurality of parts relating to music play may be further increased so that the prompt information storage section stores the operation timing data defining a plurality of the operation timings of the operation switches to be operated by the player at least for the part selected by the part selection section, and the display control section has the display section displayed at least the information about the operation timings of the operation switches relating to at least the part selected by the part selection section out of the information based on the operation timing data.

As a result, by applying the above described game machine to the music game, the effects of the present exemplary non-limiting embodiments can become more apparent.

As an alternative structure, when the communications section is used for infrared communications, the first operation timing storage section may store the data relating to the operation timings of the operation switches operated by the player during a predetermined segment of the game, the second operation timing storage section may acquire and store the data stored in the first operation timing storage section of the other game machines for each of the predetermined segment of the game, and the correlation evaluation section may evaluate, for each of the predetermined segment of the game, correlation with the other game machines in terms of game operation based on the data stored in the first operation timing storage section and in the second operation timing storage section.

Here, the segment of the game is when, for example, one music is ended in a music game as in an exemplary embodiment, which will be described later. As other possibilities, one phrase may be regarded as a segment, or a time when a plurality of selection of music are played may be regarded as a segment. Alternatively, when it is not a music game being played, a time when one stage is cleared may be a possibility.

With such a structure, the communications is required only at the beginning and at the end of the game play, and thus there is no need for connection among the game machines by communications cables, for example. Therefore, the game machine, especially a portable-type game machine, can be moved freely during the game play, and the players may not be distracted and concentrate only on the game. Even better, no communications are made during the game play so that the game machines' processing loads are reduced.

Here, as a preferable score addition technique carried out by the correlation evaluation section, the number of points to be added is differed depending on a difference between the timing based on the data stored in the first operation timing storage section and the timing based on the data stored in the second operation storage section. Alternatively, the number of points to be added may be differed depending on both a difference between the timing based on one of the data and the timing based on the operation timing data, and a difference between the timing based on one of the data and the timing based on the other of the data, or when evaluating that the data stored in the first operation timing storage section and/or in the second operation timing storage section is in the predetermined range, a game score is increased, and the number of points to be added thereto is differed based on a difference between the data to be evaluated.

In the above manners, the game score can be controlled based on the operation contents so that the game can be more fun.

A second aspect of present exemplary non-limiting embodiments is directed to a game machine for executing a predetermined game in response to a player's operation, and the game machine comprises a display section, operation switches, a communications section, a start timing synchronization section, a processing section, first and second timing storage sections, and a correlation evaluation section.

The display section displays a game screen. The operation switches are operated by the player. The communications section performs data communications among other game machines. The start timing synchronization section establishes start-timing synchronization with the other game machines in the game by communications via the communications section. The processing section carries out a predetermined process, in response when the game is synchronously started, corresponding to the player's operation of the operation switches. The first timing storage section stores data relating to a timing at which the predetermined process is carried out. The second timing storage section acquires and stores the data which is stored in the first operation timing storage section of the other game machines through communications via the communications section. The correlation evaluation section evaluates correlation in terms of game operation timing with the other game machines based on the data stored in the first operation timing storage section and the second operation timing storage section.

As described above, in the second aspect, what is evaluated is not the operation timings but the timing of the game process based on the operation timings, thereby widening the applicable game range.

A third aspect of present exemplary non-limiting embodiments is directed to a game system structured by a plurality of a game machine for executing a predetermined game in response to a player's operation, and a data processing device for evaluating operational correlation among the plurality of the game machines. The game machine comprises a display section, operation switches, a communications section, a start timing synchronization section, a prompt information storage section, a display control section, an operation timing storage section, and an operation timing data transmission section, and the data processing device comprises a timing data storage section, and a correlation evaluation section.

The display section displays a game screen. The operation switches are operated by the player. The communications section performs data communications between other game machines and the data processing device. The start timing synchronization section establishes start-timing synchronization with the other game machines in the game by communications via the communications section. The prompt information storage section stores operation timing data defining an operation timing of the operation switches to be operated by the player. The display control section has, in response to when the game is synchronously started, the display section display information about the operation timings of the operation switches to be operated by the player based on the operation timing data. The operation timing storage section stores data relating to the operation timings of the operation switches operated by the player responding to the information displayed on the display section. The operation timing data transmission section transmits the data of the operation timing storage section to the data processing device through communications via the communications section. The timing data storage section receives and stores the data, one by one, transmitted from the operation timing data transmission section through communications via the communications section. The correlation evaluation section evaluates correlation among the game machines in terms of game operation based on the data stored in the timing data storage section.

As described above, in the third aspect, a processing device is separately provided for evaluating the correlation among a plurality of game machines. Therefore, even if the evaluation is complicated or carried out very often, it enables the process.

A fourth aspect of present exemplary non-limiting embodiments is directed to a program for controlling a game executed in a game machine, and the program when executed comprises a synchronizing step, a reading step, a displaying step, a storing step, an acquiring step, and an evaluating step.

In the synchronizing step, data communications is performed among other game machines so as to establish start-timing synchronization in the game. In the reading step, read is operation timing data defining an operation timing of operation switches to be operated by a player. In the displaying step, in response when the game is synchronously started, a display section of the game machine is caused to display information about the operation timings of the operation switches to be operated by the player based on the operation timing data. In the storing step, data relating to the operation timings of the operation switches operated by the player in response to the information displayed on the display section is stored. In the acquiring step, through communications, other data relating to the operation timings of the operation switches operated by the player in the other game machines is acquired. In the evaluating step, correlation among the other game machines in terms of game operation based on the its own data and the other data is evaluated.

In order to apply the program of the fourth aspect to the music game, the synchronizing step, a generating step, a selecting step, a synchronizing step, the reading step, the display step, a setting step, the storing step, the acquiring step, and the evaluating step may be included.

In the generating step, a predetermined sound is generated in response to a player's operation of operation switches. In the selecting step, one part out of a plurality of those relating to music play is selected. In the synchronizing step, start-timing synchronization is established in the game through data communications performed among other game machines. In the reading step, operation timing data defining a plurality of the operation timings of the operation switches to be operated by the player at least for the selected part is read. In the displaying step, in response when the game is synchronously started, a display section of the game machine is caused to display information about the operation timings of the operation switches to be operated by the player at least for the selected part out of the information based on the operation timing data. In the setting step, at least one of the plurality of operation timings based on the operation timing data is set as an evaluation timing. In the storing step, data relating to the operation timings corresponding to the evaluation timing out of the operation timings of the operation switches operated by the player in response to the information displayed on the display section is stored. In the acquiring step, through communications, other data relating to the operation timings of the operation switches operated by the player in the other game machines is acquired. In the evaluating step, correlation among the other game machines in terms of game operation based on the its own data and the other data is evaluated.

Here, a step of evaluating whether the timing based on the its own data in storage is in a predetermined range from the timing based on the operation timing data may be included.

Also, the evaluating step may evaluate whether both the timing based on the its own data and the timing based on the other data are in a predetermined range.

Alternatively, the evaluating step may evaluate, by using, as a criterial timing, the timing based on either its own data or the other data whichever being the operation timing closest to the operation timing defined by the operation timing data at a predetermined timing, from the criterial timing based on one of the data, whether the timing based on the other data is in the predetermined range.

Further, the evaluating step may evaluate whether the timing based on either its own data or the other data is in a predetermined range from the timing based on the operation timing data at a predetermined timing, and whether both of the timing based on one of the data and the timing based on the other data are in the predetermined range.

Here, the operation timing data may define a plurality of the operation timings of the operation switches to be operated by the player, the step may be further provided for setting at least one of the plurality of the operation timings based on the operation timing data as an evaluation timing, and the storing step may store its own data relating to the operation timing corresponding to the evaluation timing.

Also, in the case where the communications is used for infrared communications, the storing step may store its own data relating to the operation timings of the operation switches operated by the player during a predetermined segment of the game, the acquiring step may acquire, for each predetermined segment of the game, other data relating to the operation timings of the operation switches operated by the player in the other game machines, and the evaluating step may evaluate, for each predetermined segment of the game, correlation among the other game devices in terms of game operation based on the its own data and the other data.

Here, as a score addition technique carried out in the evaluating step, the number of points to be added may be differed depending on a difference between the timing based on its own data and the timing based on the other data, or the number of points to be added may be differed depending on both a difference between the timing based on one of the data and the timing based on the operation timing data, and a difference between the timing based on one of the data and the timing based on the other of the data. Alternatively, when evaluating that the its own data and/or the other data is in the predetermined range, the evaluating step may increase a game score, and the number of points to be added thereto is differed depending on a difference of data to be evaluated.

A fifth aspect of present exemplary non-limiting embodiments is directed to a program for controlling a game executed in a game machine, and the program includes a synchronizing step, a processing step, a storing step, an acquiring step, and an evaluating step.

In the synchronizing step, the start-timing synchronization is established in the game through data communications performed among other game machines. In the processing step, a predetermined process corresponding to a player's operation on the operation switches is carried out in response to when the game is synchronously started. In the storing step, data relating to a timing at which the predetermined process is carried out is stored. In the acquiring step, other data relating to the timing at which the predetermined process is carried out corresponding to the player's operation on the operation switches in the other game machines through communications is acquired. In the evaluating step, correlation with the other game machines in terms of game process timing based on the its own data and the other data is evaluated.

By installing and executing such a program to game machines exemplified by computers, the game machines of the first to third aspects producing the above effects can be realized.

A sixth aspect of present exemplary non-limiting embodiments is directed to a game machine used in a game system structured by a plurality of the game machines executing a predetermined game in response to a player's operation, and a data processing device for evaluating operational correlation among the plurality of the game machines, and the game machine comprises a display section, operation switches, a communications section, a start timing synchronizing section, a prompt information storage section, a display control section, an operation timing storing section, and an operation timing data transmission section.

The display section displays a game screen. The operation switches are operated by the player. The communications section performs data communications between other game machines and the data processing device structuring the game system. The start timing synchronization section establishes start-timing synchronization with the other game machines in the game by communications via the communications section. The prompt information storage section stores operation timing data defining an operation timing of the operation switches to be operated by the player. The display control section has, in response when the game is synchronously started, the display section displayed information about the operation timings of the operation switches to be operated by the player based on the operation timing data. The operation timing storage section stores data relating to the operation timings of the operation switches operated by the player responding to the information displayed on the display section. The operation timing data transmission section transmits the data of the operation timing storage section to the data processing device through communications via the communications section.

These and other objects, features, aspects and advantages of the present exemplary non-limiting embodiments will become more apparent from the following detailed description of the present exemplary non-limiting embodiments when taken in conjunction with the accompanying drawings.

BRIEF DESCRIPTION OF THE DRAWINGS

FIG. 1 is an outer view of a game machine 1 according to one exemplary non-limiting embodiment.

FIG. 8 is a flowchart of an operation process carried out in step S312 of FIG. 3.

FIG. 18 is a diagram showing another exemplary case where the game machine 1 is not a music game but others.

DETAILED DESCRIPTION OF EXEMPLARY NON-LIMITING EMBODIMENTS

Figure 2:
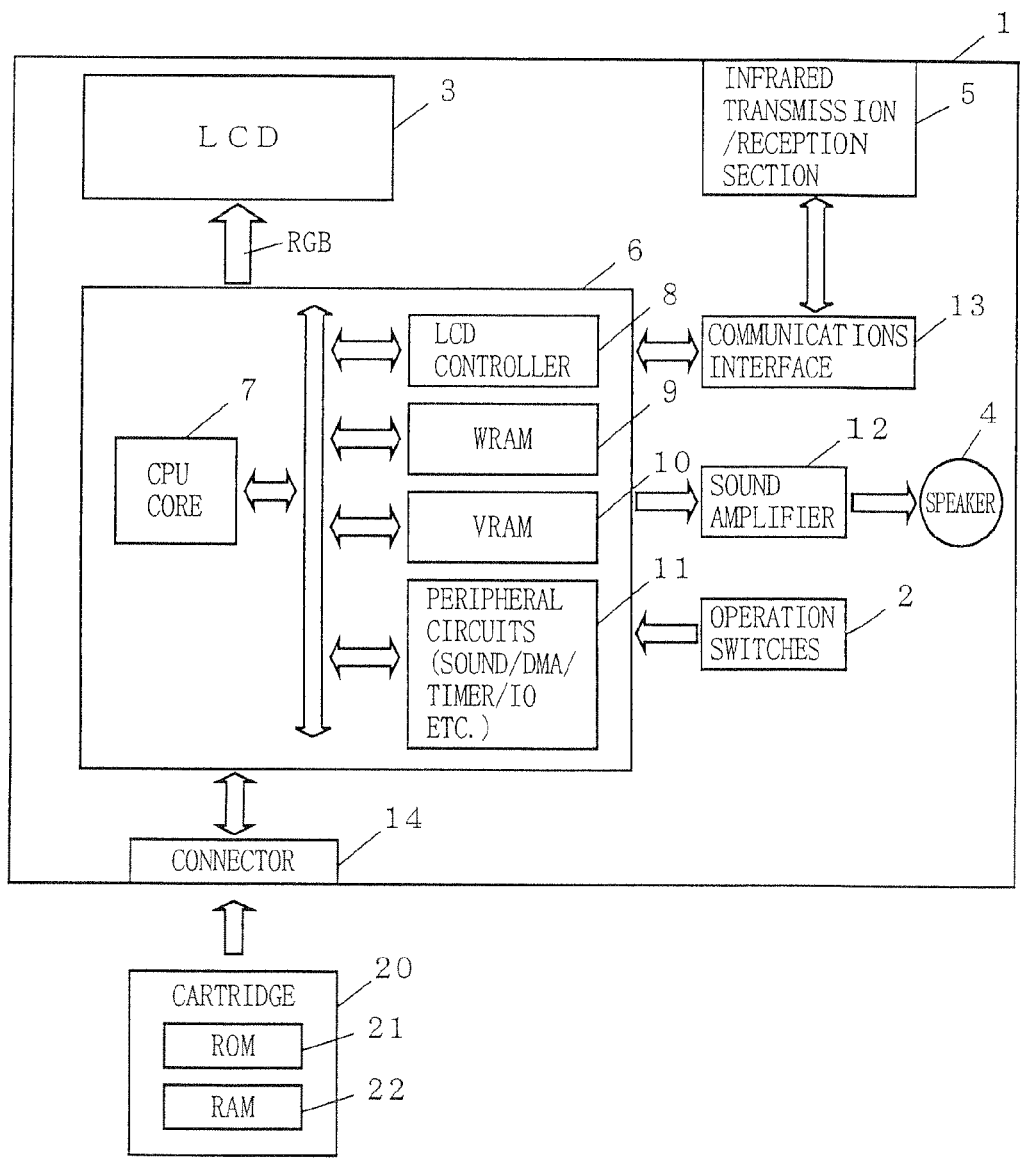
FIG. 2 is a schematic diagram showing the internal structure of the game machine 1.

FIG. 1 is an outer view of a game machine 1 according to one exemplary non-limiting embodiment. In the present embodiment, a portable game machine as shown in FIG. 1 is described, but the game machine of the present exemplary non-limiting embodiment is not limited in type, and may be a stay-at-home type.

The game machine 1 is provided with operation switches 2 (an A button 2a, a B button 2b, a cross key 2c, an R switch 2d, an L switch 2e, a start switch 2f, a select switch 2g) for a player to input game operation therethrough, a display section 3 exemplified by an LCD for displaying the game contents on its screen, a speaker 4 for sound output, an infrared transmission/reception section 5, and the like. Among the operation switches 2, the A button 2a, the B button 2b, the cross key 2c, the R switch 2d, and the L switch 2e are used for the player's operation during the game. The start switch 2f and the select switch 2g are mainly used for starting the game or menu selection, for example, but may be used for operation during the game. Here, the operation switches 2 and others provided in the game machine 1 are not restricted in position, type, and number to those shown in FIG. 1. The infrared transmission/reception section 5 is used for communications with other game machines. A game cartridge 20 is detachably connected to a connector 14 (FIG. 2) which is provided on the back side of the game machine 1.

FIG. 2 is a schematic diagram showing the internal structure of the game machine 1 of FIG. 1. The game machine 1 includes a control section 6. Connected to the control section 6 are the operation switches 2, the LCD (display section) 3, a sound amplifier 12, a communications interface 13, and the connector 14. To the sound amplifier 12, the speaker 4 is further connected, and to the communications interface, the infrared transmission/reception section 5 is further connected.

Based on operation data outputted from the operation switches 2, the control section 6 executes a game program which is read from the cartridge 20 via the connector 14. Then, the control section 6 outputs images and sound obtained by execution of the game program to the LCD 3 and the sound amplifier 12, respectively. If necessary, the control section 6 outputs to the communications interface 13 any data to be transmitted to other game machines, and receives from the communications interface 13 any data transmitted from other game machines.

The control section 6 includes a CPU core 7, an LCD controller 8, a WRAM 9, a VRAM 10, and peripheral circuits (e.g., SOUND/DMA/TIMER/IO) 11. The CPU core 7 executes the game program read from the cartridge 20 while using the WRAM 9 for temporary data storage. The resultant image data obtained by execution of the game program by the CPU core 7 is stored in the VRAM 10, and the resultant sound data is forwarded to the peripheral circuits 11. Based on the image data stored in the VRAM 10, the LCD controller 8 outputs images to the LCD 3. The peripheral circuits 11 output sound to the sound amplifier 12 based on the sound data outputted from the CPU core 7. The peripheral circuits 11 also perform memory access control such as DMA and timer control, for example.

The game cartridge 20 includes ROM 21 and RAM 22. In the ROM 21, the game program is non-changeably stored. In the RAM 22, game data obtained by execution of the game program is stored rewritable. It should be noted here that the game program executed in the game machine 1 may be non-changeably stored in advance in a memory of the game machine 1 which is not shown, and if this is the case, there is no need for the game cartridge 20. Alternatively, a recording medium exemplified by CDs or DVD disks may take the place of the game cartridge 20.

Next below, by referring to FIGS. 3 to 17, an exemplary case is described where the game machine 1 of this embodiment is a game machine executing a music game. In this example, a case where two game machines 1 play music harmoniously as actual music bands is described.

The music game described here is one by which operation information (timings and types) of the operation switches 2 needed for playing the music is displayed on the screen of the display section 3, and the music will be correctly played by the player's sequentially operating any appropriate operation switches 2 in accordance with the display. In this music game, for example, the correctness of the music play and harmoniousness at any part supposed to be in unison are indicated by scores. Here, unison denotes determination of harmoniousness (a degree of coincidence among sound timings) of the play for any specific parts of the music.

Figure 3:
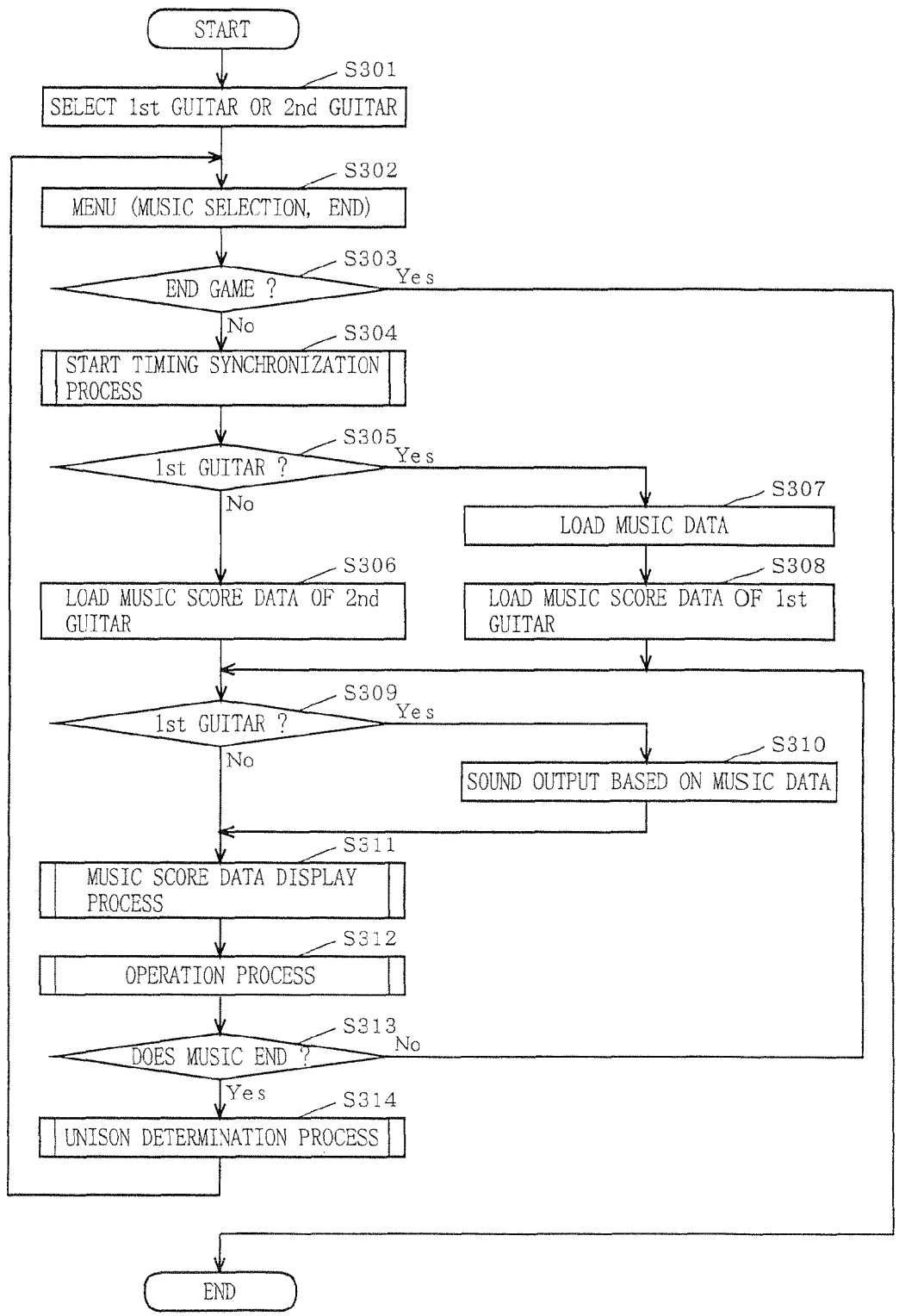
FIG. 3 is a flowchart of the basic game process applied to a music game by the game machine 1.

Referring to the flowchart of FIG. 3, described first is the basic game process carried out by the game machines 1 which structure a system (band).

First, a player selects which guitar, i.e., a 1st guitar or a 2nd guitar, for a play part (step S301). In the present exemplary non-limiting embodiment, out of the system (band) structured by a plurality of game machines 1, any one of the game machines 1 becomes a main device for controlling over the system, and the rest of the game machines 1 are sub devices. In this example, the game machine 1 selecting the 1st guitar in step S301 is the main, and the game machine 1 selecting the 2nd guitar is the sub. Also, in this example, two play parts are presumably played by two game machines 1, but the number of the play parts may be three or more, and the number of the game machines 1 for simultaneous play may be three or more (in this case also, any one of the game machines 1 becomes the main device, and the rest of the game machines are the subs). Here, every game machine 1 may be so set as to operate as the main device without making a distinction between the main device and the sub device. Next, the game machines 1 each select which music to play (all of the game machines 1 select the same music) (step S302). Here, if any player selects game end in step S302, the corresponding game machine 1 accordingly ends the game (step S303, Yes). After the music is selected in step S302, the main game machine 1 goes through a process of establishing synchronization with the sub game machine 1 in terms of start timing (step S304).

After going through such a start timing synchronization process, the main game machine 1 reads, from the memory, both music data played as BGM (including any music play except for music parts to be played by the players) during the game, and music score data of the 1st guitar as to the music selected by the player (steps S307 and S308). On the other hand, the sub game machine 1 reads, from the memory, music score data of the 2nd guitar as to the music selected by the player (step S306). Such music data and music score data are previously stored in the ROM 21 in the cartridge 20.

After steps S306 and S308, in steps S309 to S314, the music game corresponding to the music selected by the player is executed. First, the main game machine 1 outputs, from the speaker 4, sound corresponding to the music data read in step S307, i.e., sector data which is supposed to be outputted at this time (step S310), and has the music score data of the 1st guitar read in step S308 displayed on the screen of the display section 3 (step S311). On the other hand, the sub game machine 1 has the music score data of the 2nd guitar read in step S306 displayed on the screen of the display section 3 (step S311). As such, the sound played as BGM is outputted only from the main game machine 1 so that no problem arises (e.g., sound interference) even if a plurality of game machines 1 are used at the same time.

Then, the main and sub game machines 1 record and analyze, one by one, data about which operation switches 2 the player has operated, generate sound, and count the score (step S312). The sequence of processes in steps S309 to S312 is repeated until the music ends (step S313). Once the music ends, the main game machine 1 collects operation data recorded in step S312 from the sub game machine 1, and under a predetermined technique, applies a unison evaluation process thereto including its own operation data (step S314).

Figure 4:
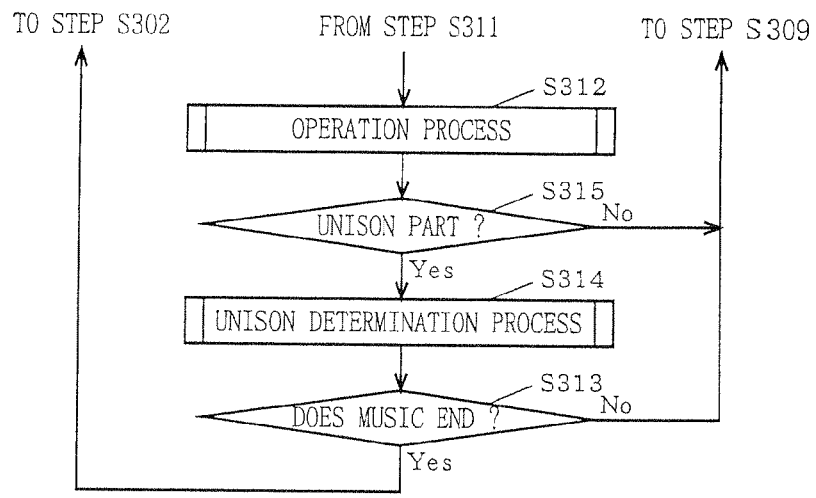
FIG. 4 is a flowchart partially showing a real-time unison evaluation process of the game process of FIG. 3.

In the above example of FIG. 3, the unison evaluation process is applied after the music play is completed. However, if high speed communications is possible, the determination process may be carried out in real time whenever a unison part (part set for unison evaluation) comes during the music play. FIG. 4 illustrates a flow of step S311 of FIG. 3 and onward for the case of real-time process.

In the example of FIG. 3, after the start timing synchronization process (step S304) is carried out, each of the game machines 1 independently executes the game program till the unison evaluation process (step S314) (no communications among the game machines 1). In this manner, the communications load can be reduced from the game machines 1, and the game machines 1 are not limited in position for such communications. In the example of FIG. 4, the game machines 1 communicate with one another during the game so that the real-time determination process is possible.

Figure 5:
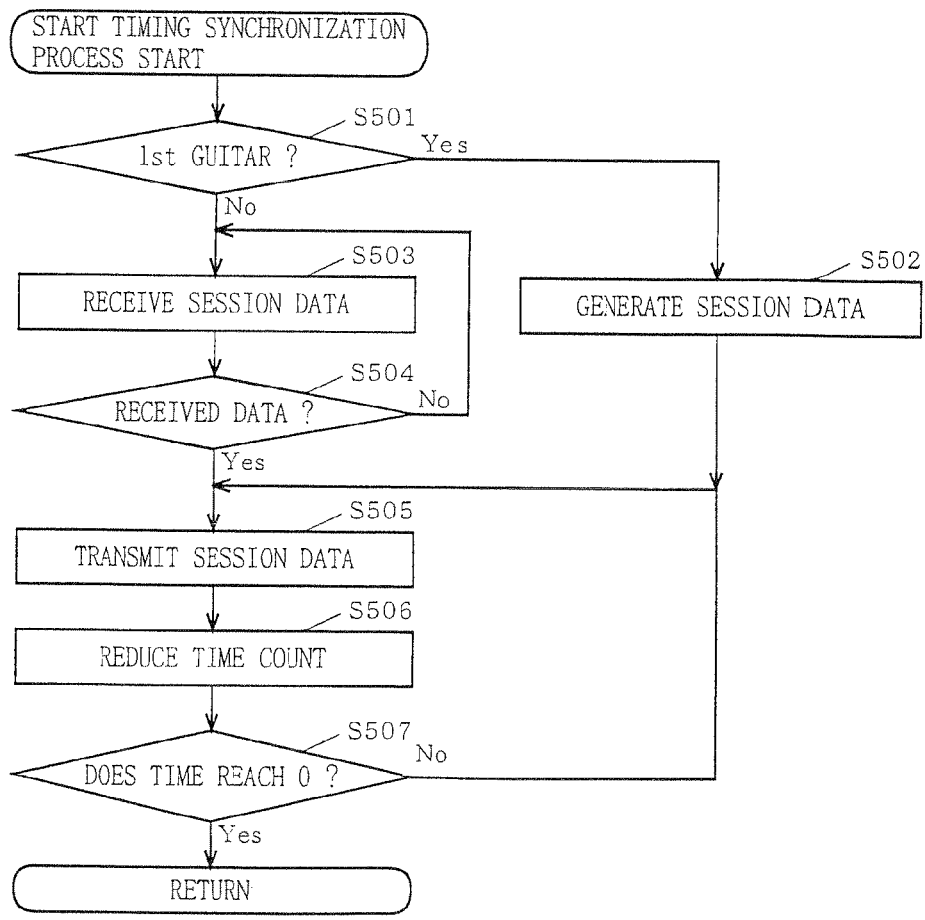
FIG. 5 is a flowchart showing a start timing synchronization process carried out in step S304 of FIG. 3.

Next, referring to the flowchart of FIG. 5, the start timing synchronization process carried out in step S304 of FIG. 3 is described.

First, the main game machine 1 (the game machine which selected the 1st guitar) generates session data for transmission to the sub game machine 1 (the game machine which selected the 2nd guitar) (step S502). This session data includes, for example, time data (e.g., 10 counts), a session ID, and a music ID needed for establishing synchronization. The session ID is a number, for example, to distinguish a session play to be played from now (game play till determined as end in step S313 of FIG. 3) from other session plays (for example, session plays carried out in some other systems), and is used not to accept data of any other session plays in the unison evaluation process, which will be described later. The music ID is used, for example, to compare a unison score with other unison scores obtained by some other session plays of the same music. Note that, the session ID is not necessarily provided if there is no game machine 1 carrying out other session plays in a communicable range, or if there is no need to make a distinction among session plays. Also, the music ID is not necessarily provided if no comparison is made among unison scores. While counting down the generated time data to "0", the main game machine 1 transmits the session data to the sub game machine 1, the infrared transmission/reception section 5 of which is faced thereto (steps S505 to S507). On the other hand, the sub game machine 1 receives the session data thus transmitted from the main game machine 1 (steps S503 and S504), and counts down the time data synchronized with the main game machine 1 (steps S506 and S507). Here, if three or more of the game machines 1 are used for game play, the sub game machine 1 which received the session data transmits the session data to other sub game machine(s) 1 until the time data becomes "0" (step S503). Even after transmitting the session data to one of the sub game machines 1, the main game machine 1 keeps transmitting the session data to other sub game machines 1.

In this manner, countdown synchronization is established among the main game machine 1 and the sub game machines 1 so that their start timings are synchronized.

Figures 6, 7:
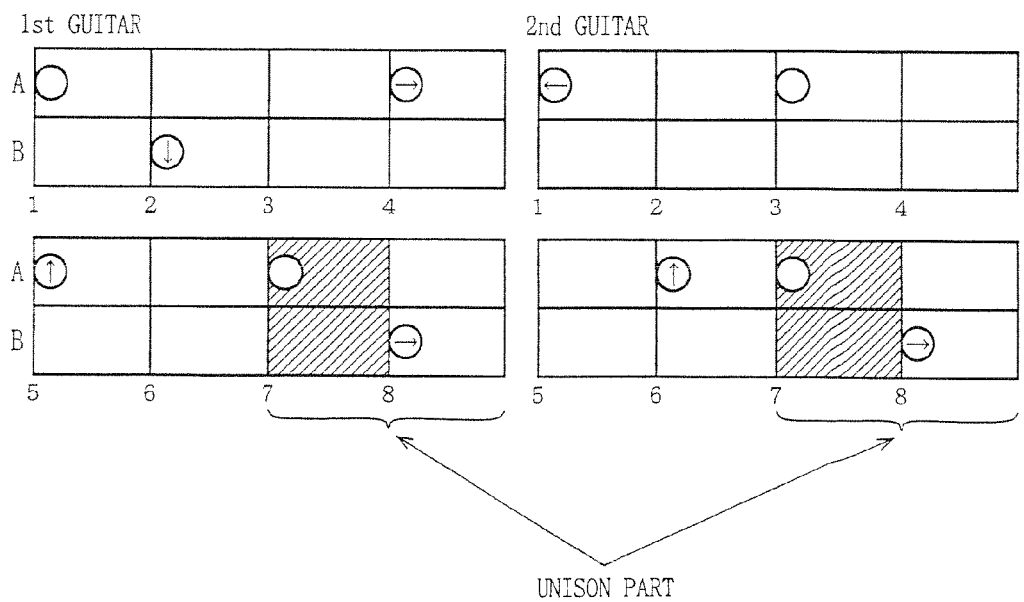
FIG. 6 is an illustration showing an example of music score data.
FIG. 7 is an illustration showing an exemplary screen of a display section 3 having the music score data displayed thereon.

Next, referring to FIG. 6, an example of the music score data displayed in step S311 of FIG. 3 is described.

The music score data exemplarily shown in FIG. 6 is composed of, on a constant basis of the timing, information about the operation of the A button 2a and the B button 2b, and information about the operation of the cross key 2c. In the example of FIG. 6, a timing is constantly equal to a quarter of a bar, and operation information is recorded for any operation switch 2 needed for the timing. For example, in the music score data of the 1st guitar, with a timing number 1, information about operating only the "A button" is recorded, and with a timing number 2, information about simultaneously operating the "B button" and "the lower part of the cross key" is recorded. The above example is not restrictive, and the timing may be arbitrarily selected as to be one-eighth of a bar, for example.

Note that, any part having no information recorded thereon indicates that there is no sound generated for the timing.

Referring to FIG. 7, an exemplary screen of the display section 3 having the music score data of FIG. 6 displayed thereon is described next.

In the example of FIG. 7, information is displayed on the screen about operating the A button 2a, the B button 2b, and the cross key 2c on the basis of two bars. In FIG. 7, ○ mark is used to indicate which of the A button 2a and the B button 2b is to be operated, and thereby, the player will know that he/she is supposed to operate the button indicated by the ○ mark.

Also, an arrow in the ○ mark indicates which part of the cross key 2c is supposed to be operated simultaneously with the A button 2a or the B button 2b. Herein, the diagonally shaded area indicates the timing for operating the operation switches 2. It should be noted here that the description found in the drawing (e.g., "1st guitar") and the timing numbers ("1" to "8") are not displayed in the actual game. The timing for operation may be indicated not by shading the corresponding area but by sound.

In FIG. 7, if the music score data shows any identical part to each other, the part is the unison part (part set for unison evaluation). In such a unison part, the timing data is at least the same for each play part (in this example, the 1st guitar and the 2nd guitar). In the example of FIG. 7, the operation switches 2 for the unison part are defined as being the same in type for the 1st guitar and the 2nd guitar, but the operation switches 2 may be varied in type.

Next, referring to the flowchart of FIG. 8, an operation process carried out in step S312 of FIG. 3 is described. This operation process is carried out by both the main game machine 1 and the sub game machine 1.

After displaying the music score data on the screen of the display section 3 with the music score data display process gone through, the game machine 1 determines whether the player has made any input through the operation switches 2 (step S801). If there is any input made through the operation switches 2, the game machine 1 records, on a predetermined memory, the inputted operation contents as operation data (step S802), and then determines whether the timing with which any of the operation switch 2 has been operated is the same as the timing which is defined and indicated by the music score data for operation (step S803). Here, if it is determined that now is not yet the timing for operation, the game machine 1 generates a sound (or a phrase) corresponding to the operation switch 2 operated by the player (step S807), and ends this operation process. On the other hand, if it is determined that now is the time for operation in step S803, the game machine 1 increases the game score, that is, adds some points to the current score corresponding to the coincidence of the timing (step S804). Thereafter, the game machine 1 refers to the recorded operation data so as to determine whether the operation switches 2 have been correctly operated, in terms of their types, as defined and indicated by the music score data (step S805). Here, if it is determined that the operation has been correct, the game machine 1 increases the game score. That is, points are added to the current game score corresponding to the coincidence of the operation switches (step S806), a sound (or a phrase) is generated corresponding to any of the operation switches 2 operated by the player (step S807), and then this operation process is terminated.

Figure 9:
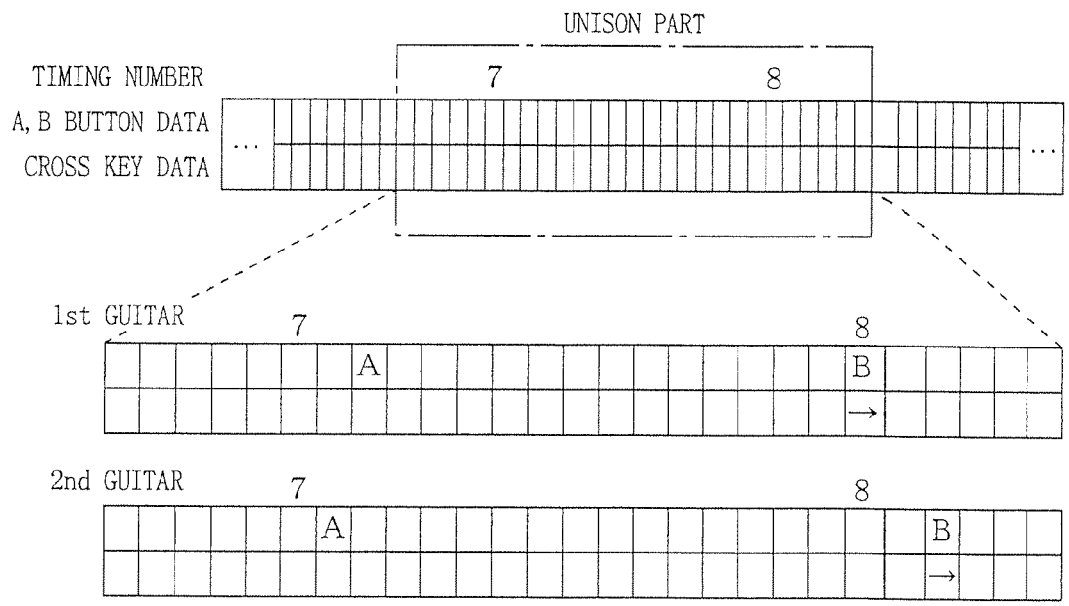
FIG. 9 is an illustration showing an example of operation data.
Figure 10:
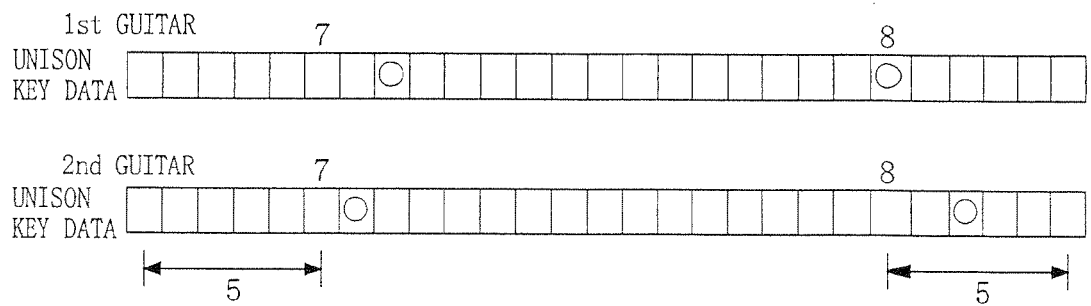
FIG. 10 is an illustration showing an example of unison key data generated from the operation data.

Next, referring to FIGS. 9 and 10, an example of the operation data recorded in step S802 of FIG. 8, and unison key data which is generated from the operation data is described.

FIG. 9 is a conceptual diagram showing regions to which operation data is recorded, and a predetermined number of regions (16 regions in this example) are provided for each of the timing numbers of the music score data. Such regions each have a correlation with the passage of time in the music score data, and the operation contents inputted by the player are recorded as the operation data into the region corresponding to the input time (relative time from the music start). Here, the regions each assigned with the timing number in the drawing are the operation timings considered most preferable for each corresponding operation switch 2 for the time. The example of FIG. 9 shows that the operation input of the player who is in charge of the 1st guitar was behind the timing by two regions from the timing number 7, and the timing was perfectly right at the timing number 8. Also, the operation input of the player who is in charge of the 2nd guitar was behind the timing by one region from the timing number 7, and behind the timing by two regions from the timing number 8.

As shown in FIG. 10, the unison key data is the one generated by extracting only the timings of the unison parts out of the operation recorded as the operation data. For example, in a case where the timing numbers 7 and 8 form a unison part, extracted as the unison key data is a range from a region preceding to the timing number 7 for a predetermined number of the regions to a region subsequent to the timing number 8 for the predetermined number of regions. FIG. 10 shows an example in which the predetermined number of regions is "5". Here, the reason of setting the predetermined number of regions to "5" is that, as will be described later, the allowable range for an absolute time lag is "3", and the allowable range for a relative time lag is "2", leading to the maximum allowable range for the time lag of "5". Data about where to set the unison parts is previously stored in the ROM 21 of the cartridge 20 as are the music data and the music score data (a plurality of unison parts are generally provided in one music, but may be limited to one). Here, if the types of the operation switches 2 are determined in the unison evaluation process, which will be described later, the unison key data may be generated by extracting also the types of the operation switches in addition to the operation timings.

Figure 11:
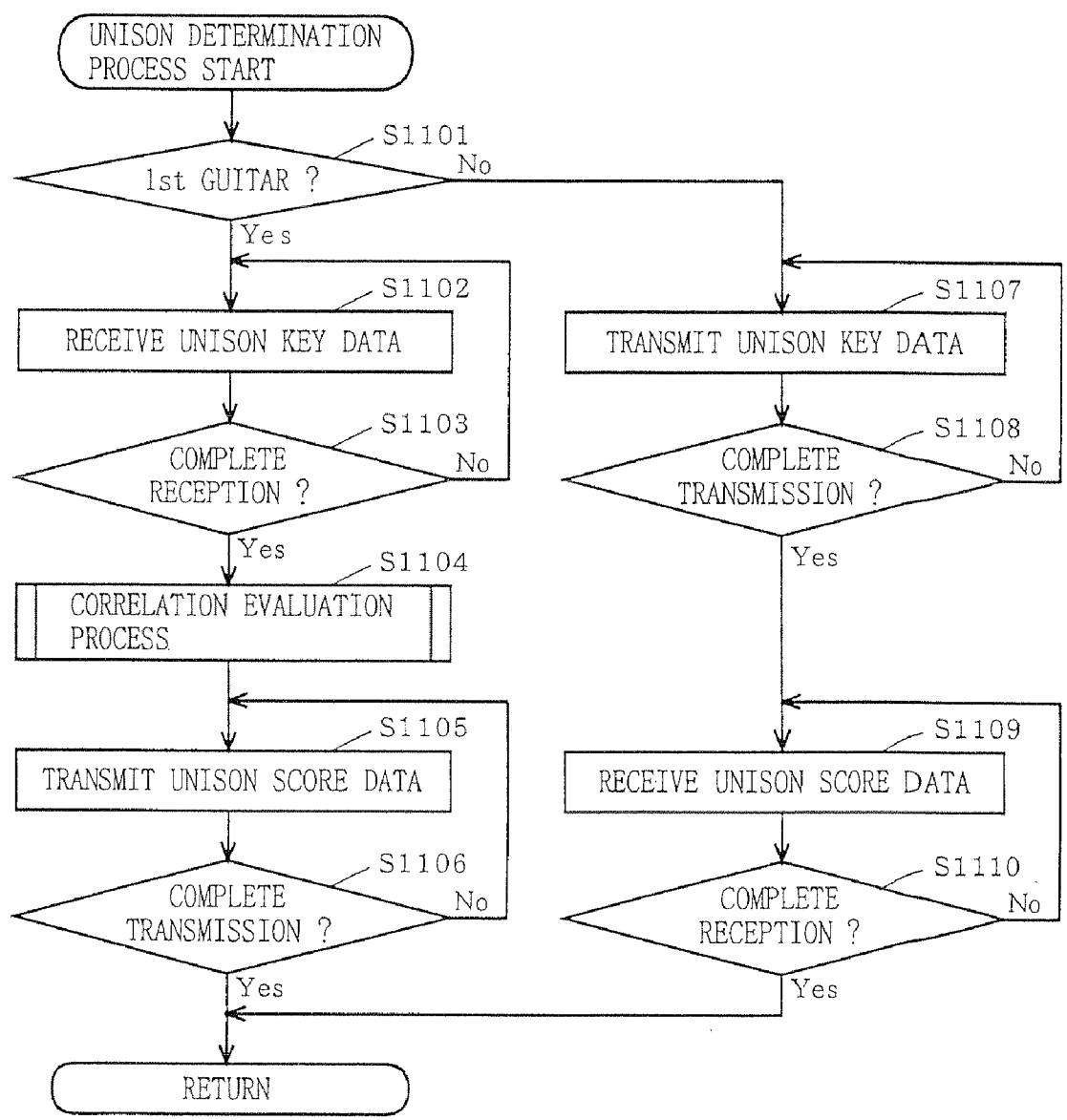
FIG. 11 is a flowchart of the unison evaluation process carried out in step S314 of FIG. 3.

Referring to the flowchart of FIG. 11, is the unison evaluation process carried out in step S314 of FIG. 3 is described next.

The sub game machine 1 (the game machine 1 which selected the 2nd guitar) transmits the unison key data generated by going through the operation process to the main game machine 1 (the game machine which selected the 1st guitar) (steps S1107 and S1108). Here, if the main game machine 1 has transmitted the session ID in the start timing synchronization process (FIG. 5), the sub game machine 1 transmits the session ID together with the unison key data.

On the other hand, the main game machine 1 receives the unison key data transmitted from the sub game machine 1 (steps S1102 and S1103). Here, if the session ID is in use, the main game machine 1 receives the data only from the sub game machine 1 showing the same session ID.

The main game machine 1 analyzes the unison key data received from the sub game machine 1 and its own unison key data so as to evaluate the correlation among the game machines 1 (step S1104). Then, the main game machine 1 calculates a game score (unison score) based on the evaluation result, and then transmits the score data to the sub game machine 1 (steps S1105 and S1106). Here, if the session ID is in use, the main game machine 1 transmits also the session ID.

On the other hand, the sub game machine 1 receives the game score data transmitted from the main game machine 1 (steps S1109 and S1110). Here. if the session ID is in use, the sub game machine 1 receives the data only when the session ID is the same.

Here, there are several of the unison key data, and the unison key data used for correlation evaluation may be limited in number, resulting in less communications amount among the game machines 1.

Figure 12:
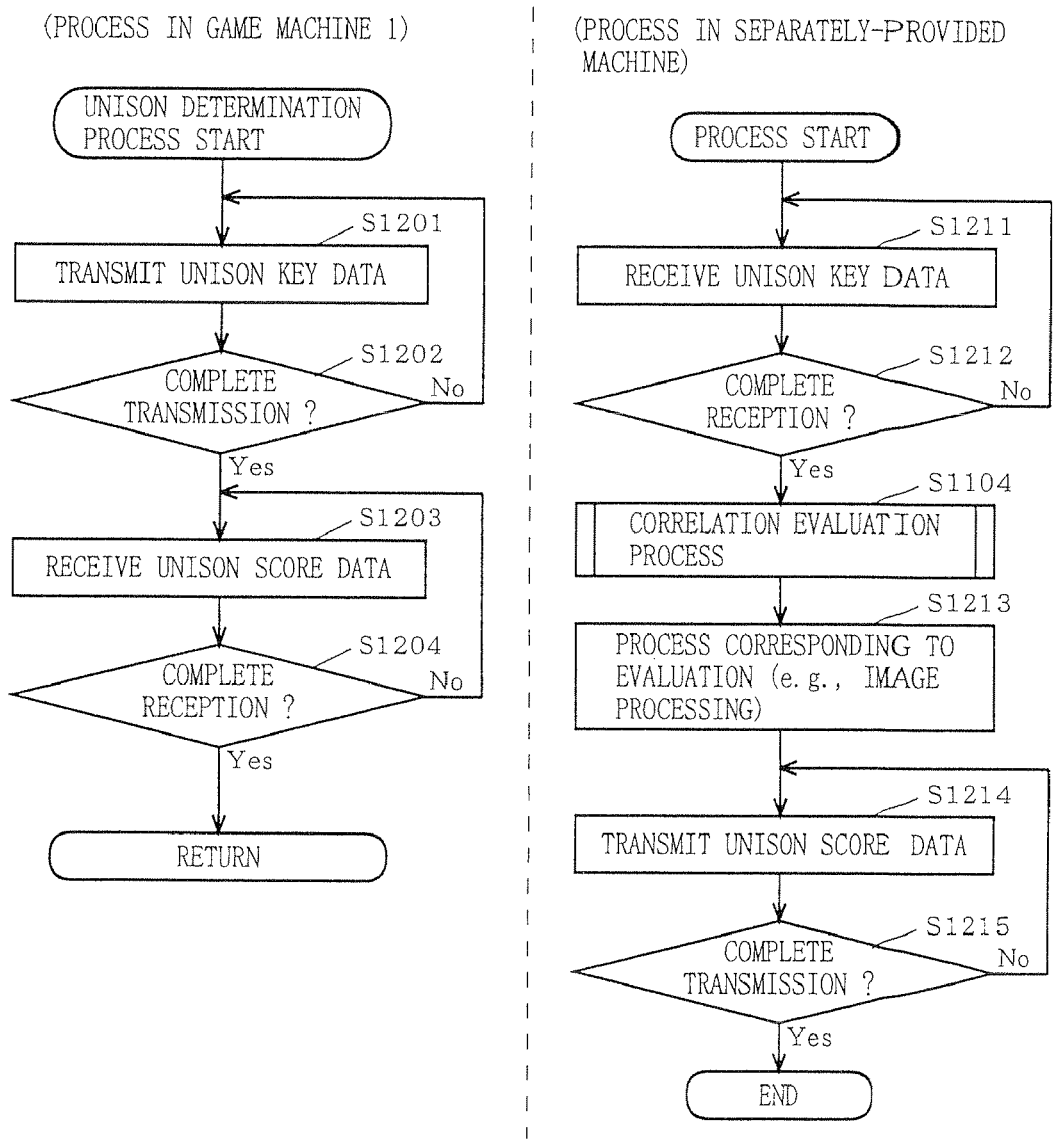
FIGS. 12 and 13 are other flowcharts of the unison evaluation process carried out in step S314 of FIG. 3.

Alternatively, out of the unison evaluation process carried out by the main game machine 1, only a part relating to the correlation evaluation process may be carried out by some other machines. Specifically, the game machine 1 may be structured as a portable-type game machine, and another machine for going through the correlation evaluation process as a stay-at-home-type game machine (not shown), and a plurality of such portable-type game machines may be connected to the stay-at-home-type game machine for game play among those portable-type game machines. Thereafter, the unison key data may be transmitted to the stay-at-home-type game machine, and the stay-at-home-type game machine accordingly evaluates and displays the correlation, for example. FIG. 12 is a flowchart of the unison evaluation process in such a case.

In FIG. 12, the main and sub game machines 1 both transmit the unison key data to another machine separately provided for the correlation evaluation process (steps S1201 and S1202). Note here that, if the session ID is in use in the start timing synchronization process (FIG. 5), the game machines 1 transmit the session ID together with the unison key data.

In response, the separately-provided machine receives the unison key data transmitted from each of the game machines 1 (steps S1211 and S1212). If the session ID is in use, the separately-provided machine receives only the data from the game machine(s) 1 showing the same session ID. Then, the separately-provided machine analyzes the unison key data received from each of the game machines 1, and evaluates the correlation among the game machines 1 (step S1104). At the same time, according to the evaluation, a process such as a screen process is gone through thereby (step S1213). The separately-provided machine then calculates a game score (unison score) based on the evaluation result, and transmits the score data to the corresponding game machine 1 (steps S1214 and S1215). Here, if the session ID is in use, the separately-provided machine transmits also the session ID.

The game machines 1 then each receives the game score data transmitted from the separately-provided machine (steps S1203 and S1204). Note that, if the session ID is in use, the game machines 1 receive data only when the session ID is the same.

Figure 13:
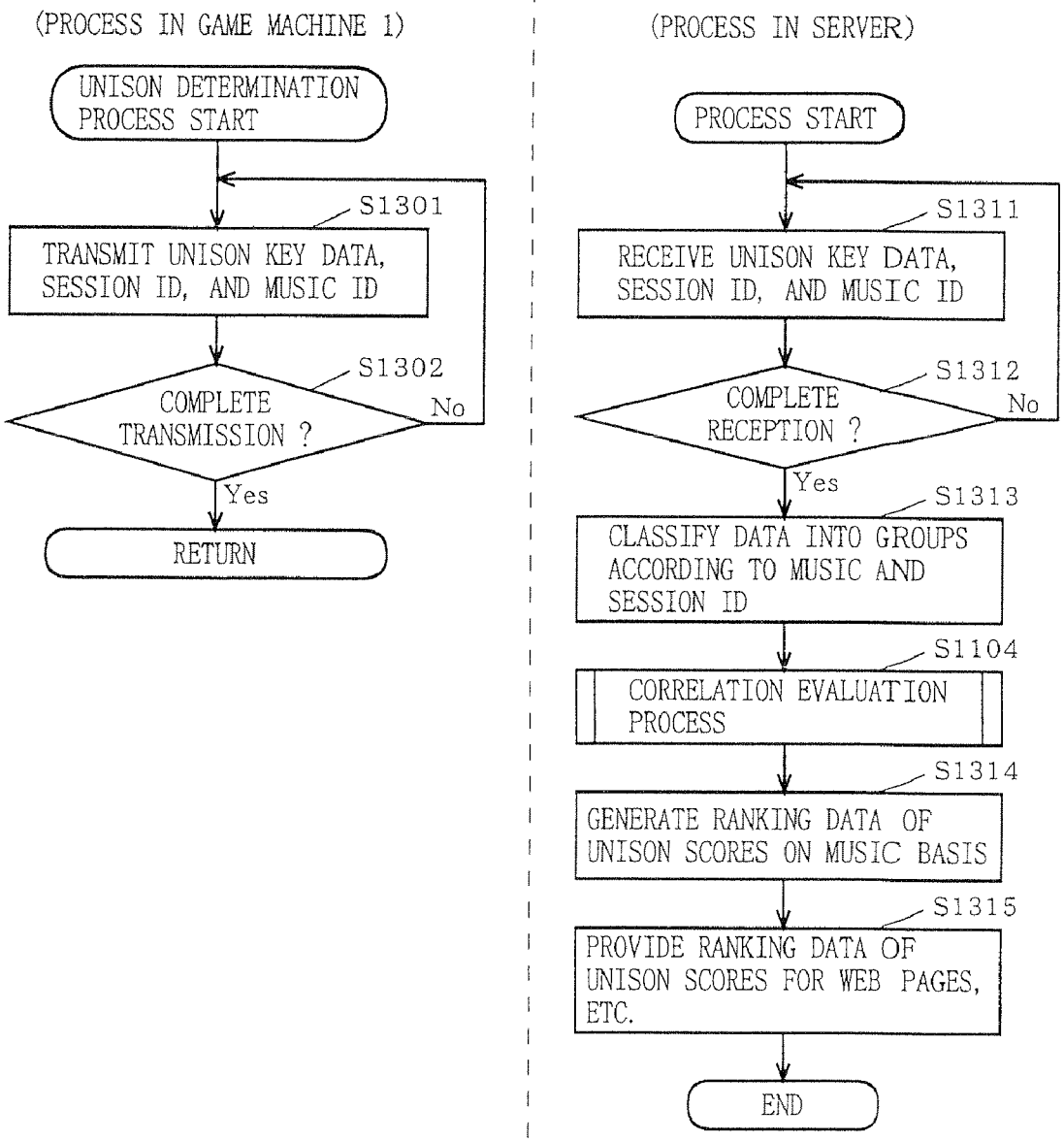

Alternatively, out of the unison evaluation process carried out by the main game machine 1, a part relating to the correlation evaluation process may be carried out in a server, in which the game results are collectively controlled, and the result may be disclosed to the third party. FIG. 13 is a flowchart of the unison evaluation process in such a case.

In FIG. 13, the main and sub game machines 1 both transmit the unison key data, the session ID, and the music ID to the server carrying out the correlation evaluation process (steps S1301 and S1302).

In response, the server receives the unison key data, the session ID, and the music ID transmitted from each of the game machines 1 (steps S1311 and S1312), and classifies the unison key data into groups according to the music and the session ID (step S1313). The server then analyzes the classified unison key data so as to evaluate the correlation among the game machines 1 on a group basis (step S1104). The server then calculates a game score (unison score) based on the evaluation result, generates ranking data of the unison scores on a music basis, and provides it to Web pages, related magazines, for example (steps S1314 and S1315).

Referring to the flowchart of FIG. 14, the correlation evaluation process carried out in step S1104 of FIGS. 11, 12, and 13 is described next.

The main game machine 1 (or the separately-provided machine or the server, the same is applicable in the below) analyzes the unison key data received from each of the game machines 1, and determines whether either of the timing of the 1st guitar or that of the 2nd guitar is falling within a range which is predetermined by using the timing defined by the music score data as a criterion (step S1401). Here, in the below, a time lag between the timing of the 1st guitar (or the 2nd guitar) and the timing defined by the music score data is referred to as an "absolute time lag". In the case where an absolute time lag of either of the guitars is in the predetermined range, the main game machine 1 next determines whether a time lag difference between the 1st guitar and the 2nd guitar is falling within the predetermined range (step S1402). Here, in the below, the time lag difference between the 1st guitar and the 2nd guitar is referred to as a "relative time lag". Then, the main game machine 1 repeats steps S1401 and S1402 to make such a determination for every note in the unison part (steps S1403 and S1404), and if every note passes the determination, the corresponding points for the part is added to the unison score (step S1405). Here, score addition may be made for every note matching. The number of points to be added can be arbitrarily set, and for example, the total points of the one based on the absolute time lag (either the 1st guitar or the 2nd guitar whichever smaller), and the one based on the relative time lag will do. Alternatively, score addition may be differed depending on the magnitude of the time lag (for example, the number of points may be determined based only on the magnitude of the relative time lag, or the number of points may be determined based both on the magnitude of the absolute time lag and the magnitude of the relative time lag). On the other hand, if neither of the absolute time lag of the 1st guitar and that of the 2nd guitar is in the predetermined range in step S1401, or if the relative time lag is not in the predetermined range in step S1402, the main game machine 1 adds no point to the unison part.

Then, the main game machine 1 applies the sequence of processes of the steps S1401 to S1405 to every unison part in the music (steps S1406 and S1407), and calculates the unison score in total for the music play.

Figure 14:
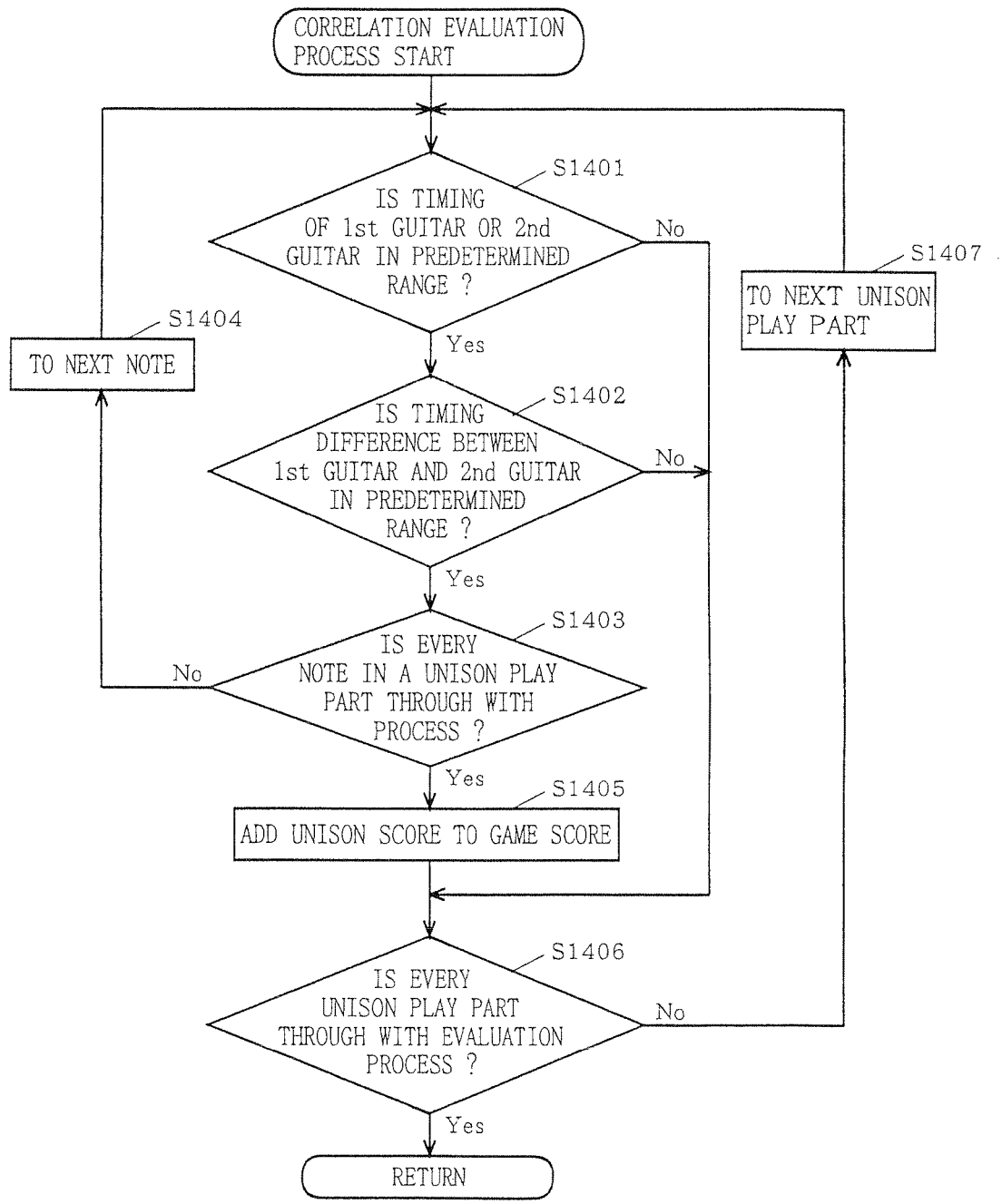
FIG. 14 is a flowchart of a correlation evaluation process carried out in step S1104 of FIG. 11.
Figure 15:
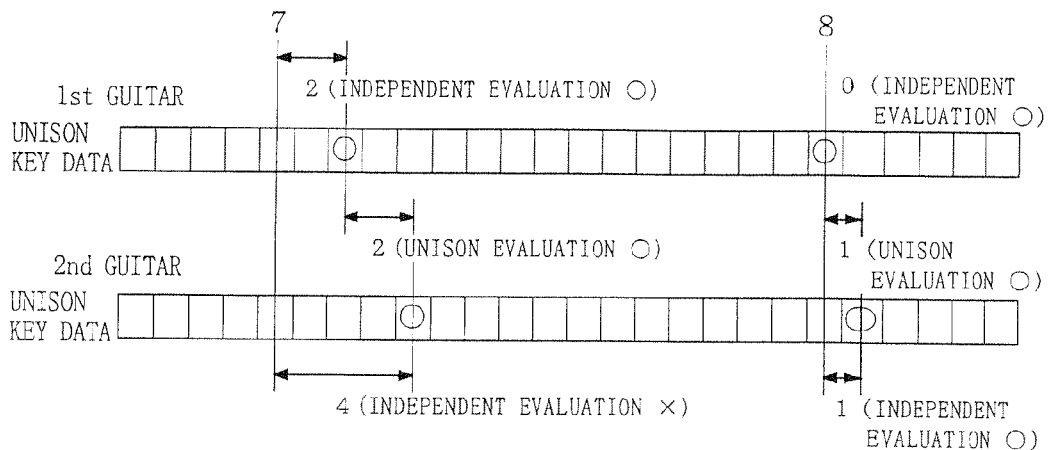
FIGS. 15 to 17 are illustrations showing a determination method carried out by using unison key data in steps S1401 and S1402 of FIG. 14.
Figure 16:
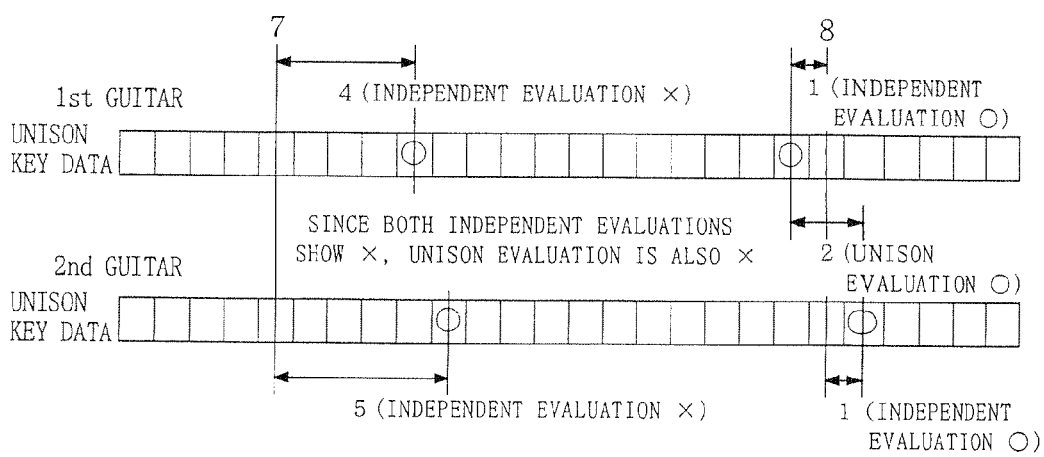
Figure 17:
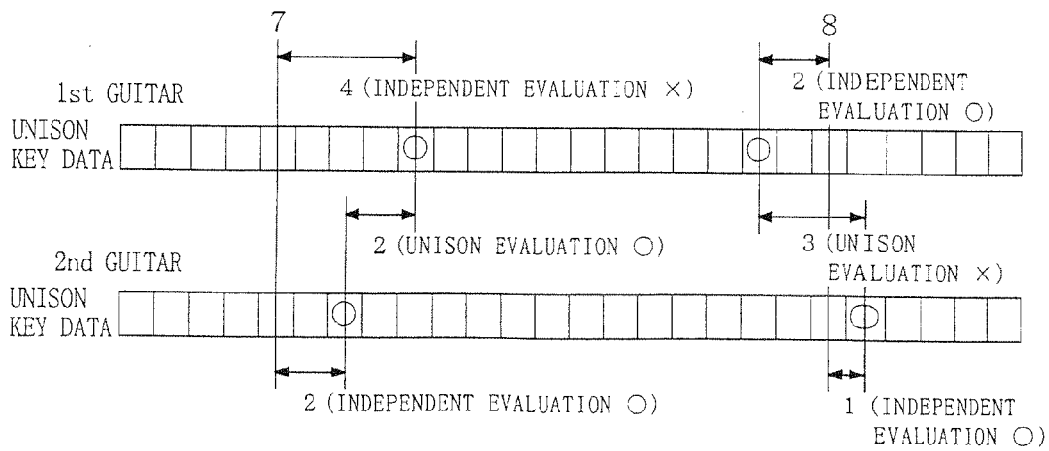

Referring to FIGS. 15 to 17, a determination method carried out by using the unison key data in steps S1401 and S1402 of FIG. 14 is described below. Here, in these drawings, two of the timing numbers 7 and 8 presumably form one unison part in the music.

Prior to going through step S1401, the main game machine 1 previously sets an allowable range for the absolute time lag. Assuming here that a range set for the purpose is starting from a region preceding to a region assigned with a timing number whose operation timing is considered most preferable for three regions to a region subsequent thereto for three regions. In the process of step S1401, the absolute time lag is determined based on whether the position on which the unison key data is recorded satisfies this allowable range (independent evaluation). Further, prior to going through step S1402, the main game machine 1 previously sets an allowable range for the relative time lag of the unison key data. Assuming here that a range for the purpose is so set as to cover two regions both preceding and subsequent thereto. In the process of step S1402, the relative time lag is determined based on whether the difference between the positions on which both of the unison key data is recorded satisfies this allowable range (unison evaluation).

Only when both the absolute time lag and the relative time lag are determined as being satisfactory, the unison evaluation for the note is considered satisfactory. When the absolute time lag is determined as being satisfactory but not the relative time lag, or when the absolute time lag is not determined as being satisfactory but the relative time lag is, unison evaluation results in failure. Moreover, only when every note in one specific unison part passes the unison evaluation, unison score addition is accordingly made. This is not restrictive, and score addition may be made when either of the absolute time lag or the relative time lag is determined as being satisfactory. Or even if every note in the unison part does not pass unison evaluation, score addition may be made in accordance with the number of notes which passed.

For example, by taking the unison key data of FIG. 15 as an example, the absolute time lag of the 1st guitar is in the allowable range at the timing number 7, and the relative time lag falls also within the allowable range. Accordingly, unison evaluation for the timing number 7 is determined as satisfactory. Also, the absolute time lags of both of the 1st guitar and the 2nd guitar at the timing number 8 are in the allowable range, and the relative time lag is also in the allowable range. Accordingly, unison evaluation for the timing number 8 is determined as satisfactory. As such, since unison evaluation is satisfactory for both of the timing numbers 7 and 8, the resultant evaluation for this unison part is satisfactory, and correspondingly unison score addition is made.

Similarly, by taking the unison key data of FIG. 16 as an example, neither of the absolute time lag of the 1st and 2nd guitars is not in the allowable range at the timing number 7. Accordingly, unison evaluation is not satisfactory for the timing number 7. Although unison evaluation for the timing number 8 is satisfactory, no unison score addition is made in the case of FIG. 16.

Similarly, by taking the unison key data of FIG. 17 as an example, the absolute time lag of the 2nd guitar is in the allowable range at the timing number 7, and the relative time lag is also in the allowable range. Accordingly, the unison evaluation for the timing number 7 is processed as satisfactory. Also, both of the absolute time lags of the 1st and 2nd guitars are in the allowable range at the timing number 8, but the relative time lag is not in the allowable range. Therefore, unison evaluation at the timing number 8 is processed as not satisfactory. In the case shown in FIG. 17, no point addition is made to the unison score.

Therefore, only the exemplary case of FIG. 15, any point corresponding to the unison evaluation is added to the unison score (FIG. 14, step S1405).

Lastly, referring to FIG. 18, an exemplary case where the game machine 1 of the present embodiment is a game machine executing not a music game but another type of game is described. FIG. 18 is a diagram showing the process of the game machine 1 which executes a shooting game.

In order to apply the above described technique to such a game, similarly, players each make a selection between the main game machine 1 (jet fighter 1) and the sub game machine 1 (jet fighter 2) (step S1801). Then, the main game machine 1 carries out the process of establishing synchronization between the main game machine 1 and the sub game machine 1 in terms of start timing (step S1802). After going through such a start timing synchronization process, the game machines 1 start a game process (game process of shooting opponent jet fighter) (step S1803). Here, the game machines 1 each stores the timing when it successfully shot a specific character appearing in the game (e.g., opponent's main character) (steps S1804 and S1805). The recorded timing is collected to the main game machine 1 through a communications process for determination of timing coincidence (steps S1806 and S1807). Then, if the timings see a coincidence with each other, the main game machine 1 adds a predetermined number of points to the game score of the corresponding game machine 1 (step S1808).

With such a sequence of processes, a game technique of enabling a plurality of players to shoot the opponent's main character and others at the same time through teamwork is provided.

In the example of music game, the coincidence degree of the operation timings among the game machines 1 is determined. On the other hand, in the example of FIG. 18, the coincidence degree of the process timing (timing when the opponent's main character is shot) among the game machines 1 is determined.

In the above embodiment, the game contents requires teamwork among the game machines 1, but the game machines 1 may play against one another or compete with one another for the game contents. There may be such a game that, for example, if the operation switches 2 are operated at the same time between one game machine 1 and the other game machine 1, the one game machine 1 is reduced in score but the other game machine 1 is added with some points.

In the above embodiment, when the operation timing is the same among the game machines 1, some points are added. This is not restrictive, and score addition may be made when the operation timing is not the same among the game machines 1, or score addition may be made when the time lag among the operation timings of the game machines 1 is a predetermined value.

In the above embodiment, the communications means is presumably used for infrared communications, but any will do as long as communications is possible thereby, for example, means such as wireless communications using radio waves such as weak radio waves, or cable transmission using cables.

As described above, according to the game machine of one present exemplary non-limiting embodiment, in a game played by a plurality of game machines, evaluation is made according to the correlation among several pieces of operation information obtained through communications with each of the game machines. Therefore, the correlation among the players' operations become high and the zest is increased to a greater degree than the time of independent play.

Moreover, determination is not made only based on the coincidence with a predetermined criterion but with the correlation among the several pieces of the operation information. Therefore, the players can find the game quite fun by aiming a high score through teamwork. Especially, only when the degree of the coincidence with the predetermined criterion is high, evaluation is made against any condition for the correlation among the operation information being satisfied. Thus, the independent evaluation is always considered, no contradiction.

Further, evaluation is made in two ways, considering each single game machine, and considering the correlation among several of those game machines. Accordingly, the players can enjoy two types of evaluations.

Furthermore, since the degree of coincidence of the operation timings is evaluated among a plurality of game machines, the players can enjoy their game operation while watching other game machines' timings to synchronize therewith.

Moreover, communications is required only at the beginning and at the end of the game play, and thus there is no need for connection among the game machines by communications cables, for example. Therefore, the game machine, especially the portable-type game machine, can be moved freely during the game play, and the players may not be distracted and concentrate only on the game. Even better, no communications are made during the game play so that the game machines are reduced in process load.

Figure 19:
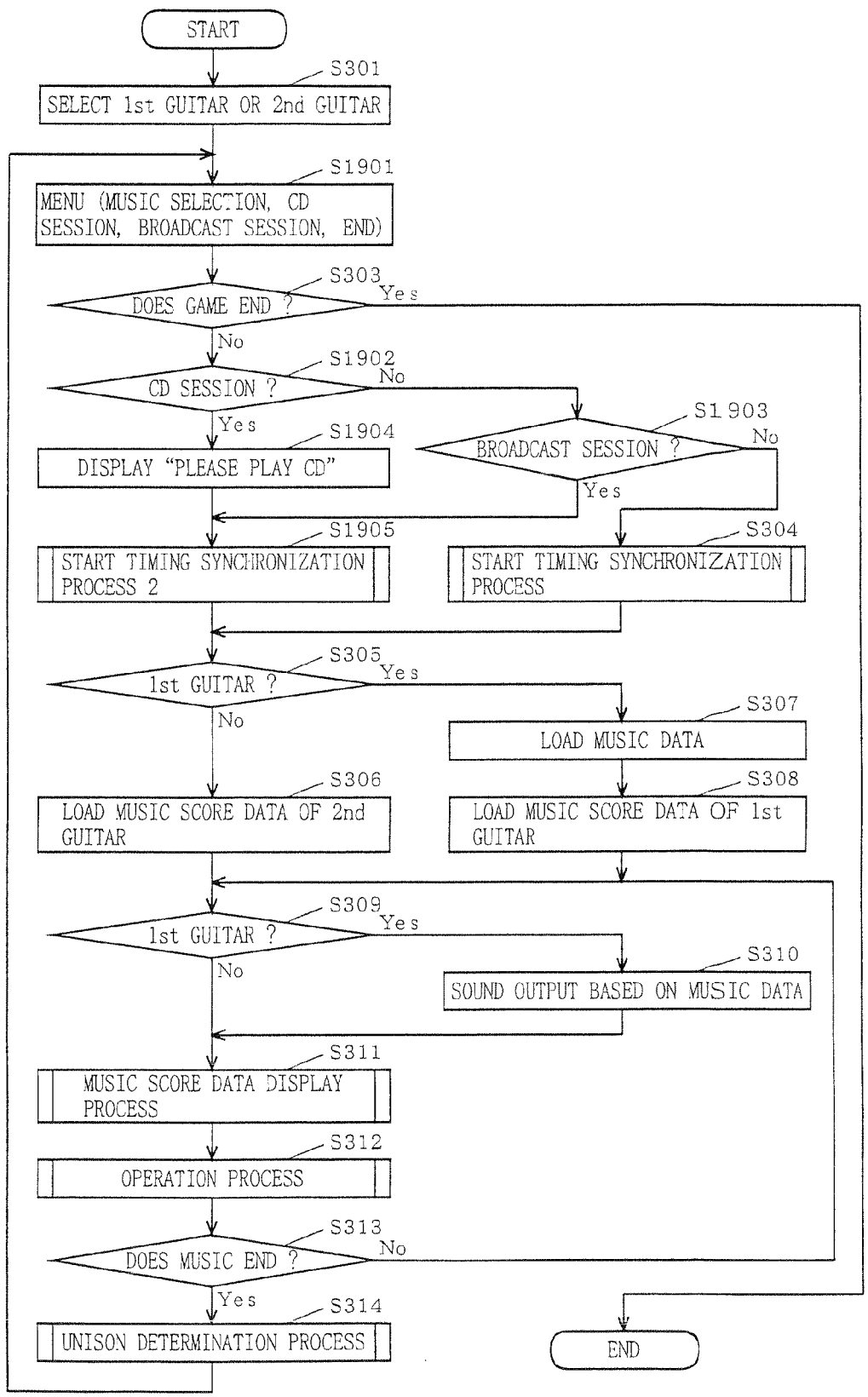
FIG. 19 is another flowchart of the basic game process applied to a music game by the game machine 1.

In the above exemplary embodiment, the case of playing (internal session) the selection of music previously stored in the ROM 21 of the game cartridge 20 (or in the game machine 1) is described. Other than that, playing (CD session) the selection of music stored in music CDs, or playing (broadcast session) the selection of music on the air may be possible. In detail, in the case of CD session, a music CD is played back first, and then the game (music play in the game) is played in accordance with the playing-back music. Also, in the case of broadcast session, any broadcast on the air is received first, and then the game is played in accordance with the playing-back music. The manner of playing is described below by referring to FIGS. 19 and 20.

Here, assuming that the game machines 1 have previously stored any music score data needed for music sessions by using CD music and broadcast music. Similarly to FIG. 3, the players each make a selection between the main game machine 1 (1st guitar) and the sub game machine 1 (2nd guitar) (step S301). In the game machine 1 which is the main, another selection is made among an internal session, a CD session, and a broadcast session, and then music is selected (step S1901). After step S1901, the main game machine 1 determines which has been selected, the internal session, the CD session, or the broadcast session (steps S1902 and S1903), and then carries out the corresponding start timing synchronization process between the sub game machine 1. In the case of the internal session, the above described start timing synchronization process is carried out between the sub game machine 1 (step S304, FIG. 3). In the case of CD session, display is made on the screen of the display section 3 as "please play the CD (selected music)" (step S1904), and in the case of the broadcast session, a start timing synchronization process 2 as shown in FIG. 20 is carried out, in synchronization with, between the sub game machine 1 (step S1905).

Figure 20:
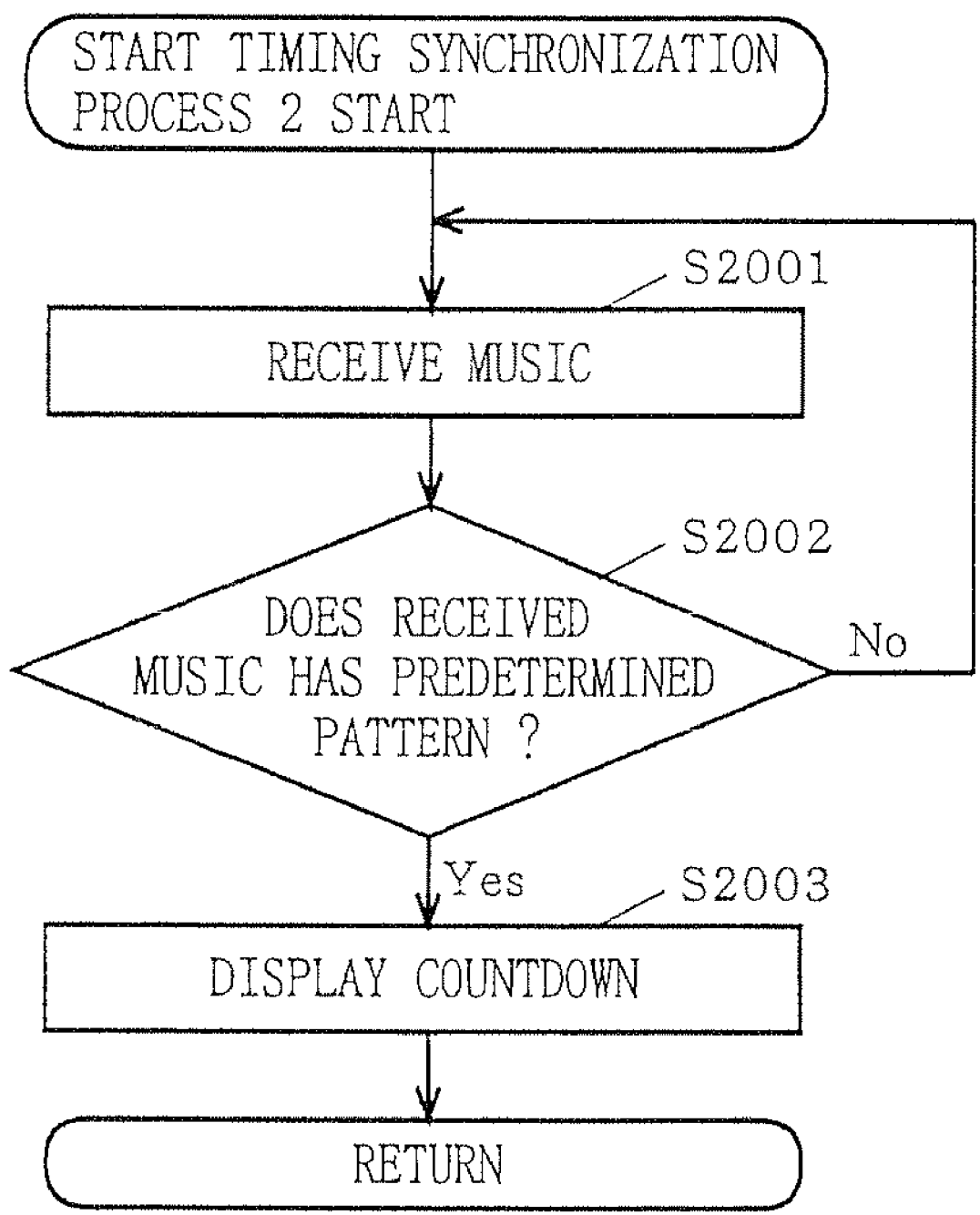
FIG. 20 is a flowchart of the start timing synchronization process 2 carried out in step S1905 of FIG. 19.

In FIG. 20, the game machines 1 each receive the CD or broadcast sound (step S2001), and then determines whether the sound pattern is the same as a predetermined pattern (step S2002). (CD or broadcast data includes predetermined sound data for instructing the start timing. Here, a predetermined sound in the intro part may be used as such a sound for instructing the start timing). Then, only when the pattern sees a coincidence, the game machines 1 perform countdown display of the time data (step S2003). Here, in the case of the CD session and the broadcast session, the game machines 1 additionally include a sound receiver and a sound recognition circuit to the structure shown in FIG. 2.

After the start timing synchronization process, the main game machine 1 reads, from the memory, the music score data of the 1st guitar as to the music selected by the player (step S308). Here, in the case of CD session and the broadcast session, a music will be played back from the CD or broadcast, and thus there is no need to read the music data as in step S307. On the other hand, the sub game machine 1 reads, from the memory, the music score data of the 2nd guitar as to the music selected by the player (step S306). Then, the main game machine 1 synchronizes the read music score data of the 1st guitar with CD or broadcast, and the sub game machine 1 synchronizes the read music score data of the 2nd guitar therewith, for display on their screens of their own display sections 3 (step S311). Here, in the case of the CD session and the broadcast session, sound output is not necessarily done based on the music data of the main game machine 1 in step S310. The main and sub game machines 1 then record and analyze, one by one, the data relating to any operation switches 2 operated by the player (operation data), and generate sounds each corresponding to the operation (step S312). The sequence of processes of steps S309 to S312 is repeated until the music ends (step S313). Once the music play is completed, the main game machine 1 collects the operation data recorded in step S312 from each of the sub game machines 1, and under a predetermined technique, applies the unison evaluation process thereto including its own operation data (step S314).

With such a sequence of processes, the CD session and the broadcast session are enabled.

While the present exemplary non-limiting embodiments has been described in detail, the foregoing description is in all aspects illustrative and not restrictive. It is understood that numerous other modifications and variations can be devised without departing from the scope of the invention.

What is claimed is:

1. A game machine for executing a predetermined game in response to a player's operation, comprising:
    a display device configured to display a game screen;
    an operation unit configured to be operated by the player;
    a communications unit configured to perform wireless data communications among other game machines;
    a start timing synchronization unit configured to establish start-timing synchronization with said other game machines in the game by communications via said communications unit;
    prompt information storage unit configured to store operation timing data defining an operation timing of said operation unit to be operated by the player;
    a display controller for having, in response when the game is synchronously started, said display device display information about the operation timings of said operation unit to be operated by the player based on said operation timing data;
    first operation timing storage unit configured to store data relating to the operation timings of said operation unit operated by the player responding to the information displayed on said display device;
    second operation timing storage unit configured to acquire and store the data which is stored in said first operation timing storage unit of said other game machines through communications via said communications unit, after said game starts in the start-timing established by the start-timing synchronization unit and the game ends; and
    correlation evaluation unit configured to evaluate correlation in terms of game operation with said other game machines based on the data stored in said first operation timing storage unit and said second operation timing storage unit, after said second operation timing storage unit establishes storing of said data;
    wherein the correlation evaluation unit is configured to evaluate correlation in terms of game operation with said other game machines based on the data stored in said first operation timing storage unit and said second operation timing storage unit by determining whether operation timing based on the data stored in said first operation timing storage unit is within a relative time range of the operation based on the data stored in said second operation timing storage unit.

2. The game machine of claim 1, wherein the correlation evaluation unit is configured to evaluate correlation by determining whether the operation timings of said operation unit to be operated by the player based on said operation timing data and the operation timings of said operation unit operated by the player responding to the information displayed on said display device is within a certain time range.

3. A machine comprising:
    a controller configured to be operated by a user;
    a communications unit configured to perform wireless data communications with another machine;
    a processing system, having one or more processors, the processing system being configured to:
        generate a screen to be displayed on a display device for viewing by the user, the screen showing prompt information prompting the user to operate the controller at particular operation timings;
        compare the operation timings of the prompt information with actual operation timings of the controller when the user operates the controller of the machine in response to the prompt information;
        determine a first time difference between the operation timings of the prompt information and the actual operation timings of the controller;
        receive operation timing data from the other machine through the communications unit, the received operation timing data corresponding to actual operation timings of a controller of the other machine when the controller of the other machine is operated in response to operation timings of prompt information displayed by the other machine, operation timings of the prompt information displayed by the other machine having a predetermining timing relationship with the operation timings of the prompt information displayed by the screen of the machine;
        compare the operation timings corresponding to actual operation timings of the controller of the machine and the actual operation timings of the controller of the another machine;
        determine a second time difference based on the comparison between the operation timings corresponding to actual operation timings of the controller of the machine and the actual operation timings of the controller of the another machine; and
        evaluate correlation in terms of operation of the controller of the machine and the controller of the another machine based on the second time difference by determining whether the second time difference is within a relative time range.

4. The machine of claim 3, wherein the processing system is further configured to evaluate user operation of the machine based on the first time difference and the second time difference.

* * * * *